US009673894B2

(12) United States Patent
Gariepy et al.

(10) Patent No.: US 9,673,894 B2
(45) Date of Patent: Jun. 6, 2017

(54) CHARACTERIZATION OF LINEAR CROSSTALK ON MULTIPLEXED OPTICAL SIGNALS

(75) Inventors: Daniel Gariepy, Quebec (CA); Gang He, Quebec (CA)

(73) Assignee: EXFO INC., Québec (CA)

( * ) Notice: Subject to any disclaimer, the term of this patent is extended or adjusted under 35 U.S.C. 154(b) by 488 days.

(21) Appl. No.: 14/009,236

(22) PCT Filed: May 28, 2012

(86) PCT No.: PCT/CA2012/050351
§ 371 (c)(1),
(2), (4) Date: Oct. 1, 2013

(87) PCT Pub. No.: WO2012/162830
PCT Pub. Date: Dec. 6, 2012

(65) Prior Publication Data
US 2014/0086574 A1   Mar. 27, 2014

Related U.S. Application Data

(60) Provisional application No. 61/490,668, filed on May 27, 2011.

(51) Int. Cl.
*H04B 10/07* (2013.01)
*H04B 10/079* (2013.01)

(52) U.S. Cl.
CPC ......... *H04B 10/07* (2013.01); *H04B 10/0795* (2013.01); *H04B 2210/07* (2013.01)

(58) Field of Classification Search
CPC . H04B 10/0795; H04B 10/07; H04B 2210/07
(Continued)

(56) References Cited

U.S. PATENT DOCUMENTS 5,991,023 A * 11/1999 Morawski ............. G01J 3/0259
356/326
6,549,018 B1 * 4/2003 Bleck ................. H04B 10/0775
324/628
(Continued)

OTHER PUBLICATIONS

Llorente et al, Linear and Nonlinear Crosstalk Evaluation in DWDM Networks Using Optical Fourier Transformers, Jan. 2005, EURASIP Journal on Applied Signal Processing, pp. 1593-1602.*
(Continued)

*Primary Examiner* — Ken N Vanderpuye
*Assistant Examiner* — Dibson Sanchez
(74) *Attorney, Agent, or Firm* — Norton Rose Fulbright Canada LLP; Alexandre Daoust

(57) ABSTRACT

There is provided a method of determining at least one linear-crosstalk-related parameter of an optical signal-under-test having, within an optical channel bandwidth, at least a data-carrying signal contribution and a wavelength-dependent linear-crosstalk contribution arising from a data-carrying signal contribution of an adjacent optical signal associated with an adjacent channel to the optical signal-under-test, the method comprising: acquiring at least one optical spectrum trace encompassing a quasi-continuum of closely-spaced wavelengths over a spectral range extending to at least part of both the signal under test and the adjacent optical signal; and estimating said linear-crosstalk contribution using at least spectral properties of said at least one optical spectrum trace; wherein one of said at least one linear-crosstalk-related parameter is the linear-crosstalk contribution and is determined from said estimating.

24 Claims, 8 Drawing Sheets

(58) Field of Classification Search
USPC .................................................. 398/9–38
See application file for complete search history.

(56) References Cited

U.S. PATENT DOCUMENTS

| | | | | |
|---|---|---|---|---|
| 6,836,620 | B1* | 12/2004 | Bischoff | H04B 10/07953 398/25 |
| 7,116,419 | B1* | 10/2006 | Weiner | G01J 3/447 356/364 |
| 7,343,101 | B1* | 3/2008 | Frankel | H04B 10/2543 398/158 |
| 7,801,017 | B2* | 9/2010 | Nuzman | H04B 3/487 370/201 |
| 2002/0186428 | A1* | 12/2002 | Saleheen | H04B 10/85 398/39 |
| 2003/0016882 | A1* | 1/2003 | Riley | G01J 3/28 382/275 |
| 2003/0123065 | A1* | 7/2003 | Park | G01J 9/04 356/484 |
| 2004/0047283 | A1* | 3/2004 | Bonwick | H04B 10/69 370/201 |
| 2004/0052523 | A1* | 3/2004 | Yadlowsky | H04J 14/0227 398/34 |
| 2004/0114939 | A1* | 6/2004 | Taylor | H04B 10/61 398/152 |
| 2004/0247319 | A1* | 12/2004 | Melman | H04B 10/077 398/65 |
| 2005/0030884 | A1* | 2/2005 | Kim | H04B 3/23 370/201 |
| 2005/0276601 | A1* | 12/2005 | Morawski | G01J 3/28 398/42 |
| 2007/0133815 | A1* | 6/2007 | Cheong | H04B 1/0475 381/71.1 |
| 2007/0253469 | A1 | 11/2007 | Kite | |
| 2008/0124076 | A1* | 5/2008 | Rudolph | H04B 10/07953 398/26 |
| 2008/0187077 | A1 | 8/2008 | Matza et al. | |
| 2009/0116582 | A1 | 5/2009 | Ashikhmin | |
| 2010/0329694 | A1* | 12/2010 | Frankel | H04B 10/58 398/159 |
| 2011/0091206 | A1* | 4/2011 | He | H04B 10/07953 398/26 |
| 2011/0142455 | A1 | 6/2011 | Liu et al. | |
| 2012/0263464 | A1* | 10/2012 | Koike-Akino | H04B 10/6162 398/65 |
| 2014/0240819 | A1* | 8/2014 | Tsuchida | G02B 6/02042 359/341.33 |

OTHER PUBLICATIONS

Winzer, P.J. et al., "Coherent Crosstalk in Ultradence WDM Systems", Journal of Lightwave Technology, vol. 23, No. 4, pp. 1734-1744, Apr. 2005.

Weinert, C.M. et al., "Histogram method for identification and evaluation of crosstalk", Electronic Letters, vol. 36, No. 6, pp. 558-559, Mar. 16, 2000.

Tremblay,C. et al, "Colorless WDM Optical Core Networks Based on Coherent Systems", ICTON 2011 (International Conference on Transparent Optical Networks), 2011.

Baney, Douglas M. et al., "Coherent Optical Spectrum Analyzer", IEEE Photonics technology letters, vol. 14, No. 3, Mar. 2002.

Lee, J.H., et al., "OSNR Monitoring Technique Using Polarization-Nulling Method", IEEE Photonics technology letters, vol. 13, No. 1, Jan. 2001.

Krummrich P.M., "Spatial multiplexing for high capacity transport", Opt. Fiber Technol. (2011), doi:10.1016/j.yofte.2011.07.001.

* cited by examiner

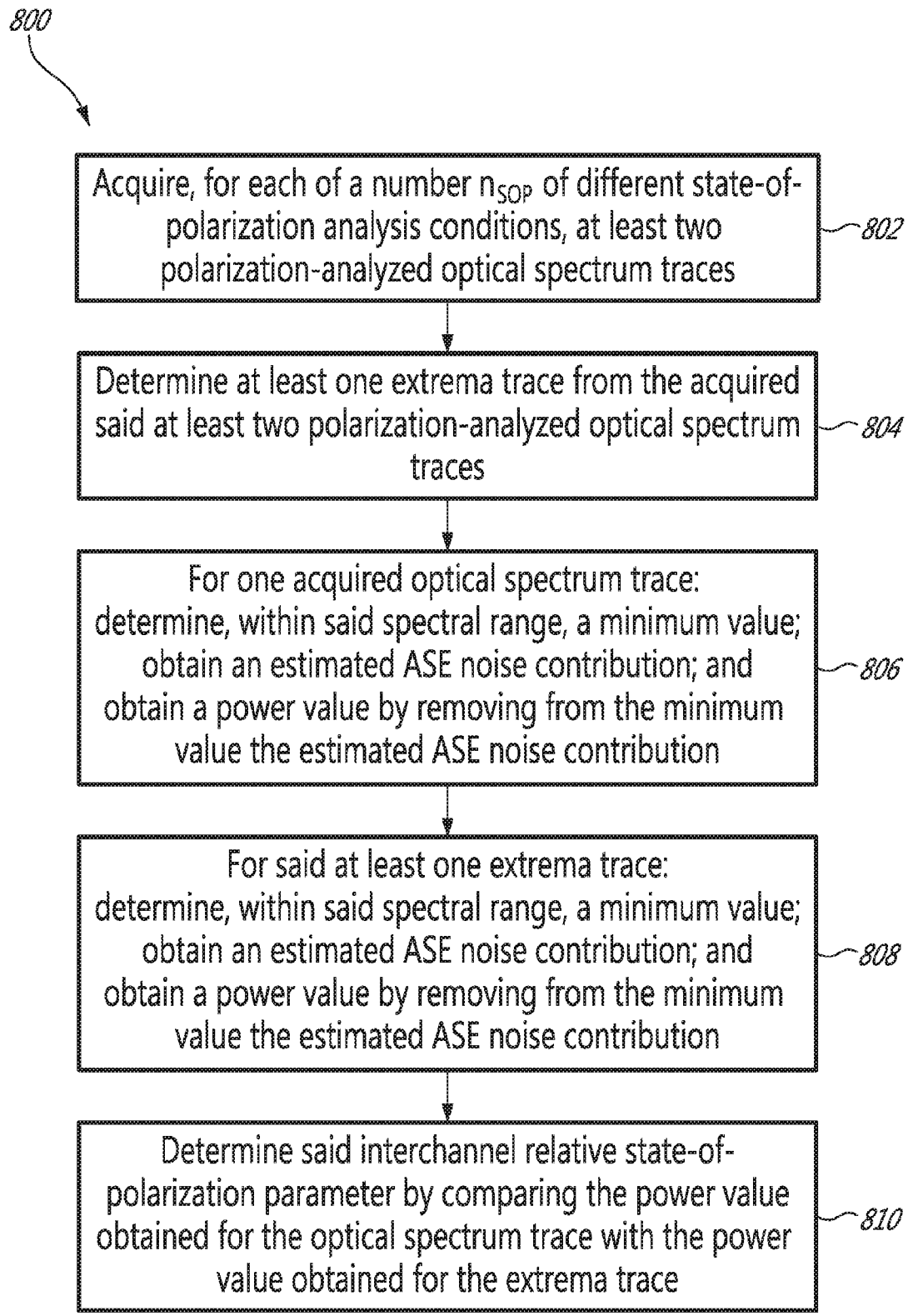

CHARACTERIZATION OF LINEAR CROSSTALK ON MULTIPLEXED OPTICAL SIGNALS

CROSS-REFERENCE TO RELATED APPLICATIONS

This application claims priority under 35 USC §119(e) of U.S. provisional patent application 61/490,668 filed May 27, 2011; the specification of which is hereby incorporated by reference.

TECHNICAL FIELD

The invention relates to the characterization of in-band optical noise on optical signals for telecommunication applications, where the optical signals have been multiplexed for propagation along an optical fiber.

BACKGROUND OF THE ART

The Optical Signal-to-Noise Ratio (OSNR) is a conventional measure of the quality of a signal carried by an optical telecommunication link. Under normal and proper operating conditions, the OSNR of an optical communication link is typically high, often in excess of 15 dB or 20 dB, or even greater. The dominant component of the noise in an optical communication link is typically unpolarized Amplified Spontaneous Emission (ASE) noise, which is a spectrally broadband noise source contributed by the optical amplifiers in the link.

Some methods exist for characterization of ASE noise on optical telecommunication signals based on an in-band analysis of the optical signal. Such methods include methods referred to as "polarization-nulling" methods (see J. H. Lee et al., "OSNR Monitoring Technique Using Polarization-Nulling Method", IEEE Photonics Technology Letters, Vol. 13, No. 1, January 2001) as well as variants thereof, and the methods referred to as "differential polarization response" methods (see International Patent Application Publication WO 2008/122123 A1 to Gariépy et al.; and WO 2011/020195 A1 to He et al., both applications being commonly owned by the Applicant).

Polarization-nulling methods exploit the fact that the signal peak is generally polarized whereas ASE noise is generally unpolarized. By means of a polarization controller disposed before a linear polarizer, the combination serving as a polarization analyzer, it is possible to orthogonally align the polarization axis of the analyzer to the State Of Polarization (SOP) of the signal-under-test in order to find a condition where the signal peak is maximally suppressed. An optical spectrum trace is acquired while the signal peak is suppressed and reveals the in-band noise within the optical-channel bandwidth. In polarization-nulling methods, this in-band noise is normally assumed to only include ASE noise.

Differential polarization response methods involve the polarization-sensitive detection of an optical spectrum with Optical Spectrum Analyzer (OSA) means, where two or more optical spectrum traces are acquired under different polarization analysis conditions. However, unlike polarization-nulling methods, the differential polarization response approach does not require that the polarized signal be suppressed or close to the electronic noise floor of the measurement instrument for any of the acquired optical spectrum traces. Instead, differential polarization response methods employ a mathematical discrimination of the signal peak from the in-band noise in the acquired optical spectrum traces using calculations and a comparison between the acquired traces. This results in significantly less stringent requirements on both the polarization control of the signal-under-test and the quality of the OSA components (e.g. polarization extinction ratio), and leads to a significantly reduced measurement time in comparison to polarization-nulling methods. In differential polarization response methods, the in-band noise that is discriminated from the signal peak is also normally assumed to only include ASE noise.

However, in addition to ASE noise, there are other optical sources of distortion that may be present and significant on optical telecommunication signals for next generation high-speed networks. For example, the optical signal quality may be impaired by "linear crosstalk", an interchannel phenomenon arising principally from adjacent channels. Upon application of in-band OSNR measurement methods of the art, such as prior-art polarization-nulling methods and prior-art differential polarization response methods, non-ASE optical noise such as linear crosstalk can be confused with ASE noise and/or distort the spectrum of the optical signal, thereby leading to inappropriate characterization of the in-band noise superposed on the optical signal-under-test.

Linear crosstalk within the channel bandwidth of a given channel-under-test arises from the presence of optical power that nominally is found entirely in an adjacent channel, propagating within the same optical fiber and characterized by a different central wavelength, but whose spectral extent is such that some of its optical power may fall within the channel-under-test and superpose upon in-band ASE noise. In the context of in-band OSNR measurements, linear crosstalk may affect the measurement uncertainty of in-band ASE noise measured by prior-art polarization-nulling methods and prior-art differential polarization response methods. Additionally, linear crosstalk itself also constitutes a non-ASE optical noise that may need to be quantified in order to more fully characterize the quality of an optical signal-under-test.

Accordingly, for advanced signal-quality characterization and OSNR measurement, there is a need for a method enabling characterization of linear crosstalk on optical signals and/or allowing improved characterization of ASE noise that discriminates between ASE noise and linear crosstalk on the signal-under-test.

SUMMARY

In the case of non-polarization-multiplexed signals, linear crosstalk on a Signal-Under-Test (SUT), normally comprising a data-carrying contribution, within a channel-under-test is characterized by the optical power spectral distribution of the linear crosstalk and the relative State Of Polarization (SOP) between the SUT and the optical signal within crosstalk-inducing channel(s) adjacent the channel-under-test on both sides thereof. Using these characteristics of the linear crosstalk, i.e. the optical spectrum and the relative SOP, it is possible to evaluate the impact of linear crosstalk on optical signal quality. More specifically, the linear crosstalk may be characterized using linear crosstalk parameters which may be derived from the aforementioned two characteristics, e.g. parameters such as the parallel-polarized crosstalk (same polarization as the SUT) and the cross-polarized crosstalk (cross-polarized relative to the SUT), of which the parallel-polarized crosstalk is the most relevant in terms of the impact of linear crosstalk on optical signal quality. (Both of these parameters will be defined hereinafter.)

In the case of polarization-multiplexed signals, the total light resulting from polarization-multiplexing of the signals normally appears effectively unpolarized. i.e. the degree of polarization (DOP) is approximately zero. The linear crosstalk then also appears unpolarized. In such a case, characterization of the linear crosstalk relies upon an estimation of the optical spectrum of its optical power distribution superposed on the SUT.

In accordance with a first aspect, there is provided a method for characterizing linear crosstalk on an optical SUT.

In accordance with a second aspect, there is provided a method for characterizing the in-band ASE-noise comprised in an optical SUT by discriminating, at least approximately, its contribution from the noise contribution caused by linear crosstalk to allow improved characterization of in-band ASE noise compared to methods of the prior art.

There is provided a method for determining an linear-crosstalk-related parameter on an optical signal-under-test (SUT) having a data-carrying signal contribution and a linear-crosstalk contribution within its optical channel bandwidth, the linear-crosstalk contribution arising from an adjacent optical signal of an adjacent channel to the SUT which also has a data-carrying signal contribution within its optical channel bandwidth. The method comprises: acquiring at least one optical spectrum trace of the SUT and the adjacent optical signal; estimating the linear-crosstalk contribution of the adjacent optical signal in the optical channel bandwidth of the SUT, using spectral properties of the at least one optical spectrum trace and/or a trace obtained from the at least one optical spectrum trace; and determining the linear-crosstalk-related parameter on the SUT using the estimated linear-crosstalk contribution of the adjacent optical signal on the SUT.

In accordance with one aspect, there is provided a method of determining at least one linear-crosstalk-related parameter of an optical signal-under-test having, within an optical channel bandwidth, at least a data-carrying signal contribution and a wavelength-dependent linear-crosstalk contribution arising from a data-carrying signal contribution of an adjacent optical signal associated with an adjacent channel to the optical signal-under-test, the method comprising: acquiring at least one optical spectrum trace encompassing a quasi-continuum of closely-spaced wavelengths over a spectral range extending to at least part of both the signal under test and the adjacent optical signal; and estimating said linear-crosstalk contribution using at least spectral properties of said at least one optical spectrum trace; wherein one of said at least one linear-crosstalk-related parameter is the linear-crosstalk contribution and is determined from said estimating.

Linear-crosstalk-related parameters can include linear-crosstalk contribution, interchannel relative SOP parameter, and in-band ASE noise parameter(s) such as an in-band ASE noise contribution superposed on both a linear-crosstalk contribution and a data-carrying signal contribution of an optical SUT or related ratios, to name a few examples.

In accordance with a another aspect, there is provided an apparatus for determining at least one linear-crosstalk-related parameter of an optical signal-under-test having, within an optical channel bandwidth, at least a data-carrying signal contribution and a wavelength-dependent linear-crosstalk contribution arising from a data-carrying signal contribution of an adjacent optical signal associated with an adjacent channel to the optical signal-under-test, the apparatus comprising: an acquirer at least one optical spectrum trace encompassing a quasi-continuum of closely-spaced wavelengths over a spectral range extending to at least part of both the signal under test and the adjacent optical signal; an estimator to estimate said linear-crosstalk contribution using at least spectral properties of said at least one optical spectrum trace, wherein one of said at least one linear-crosstalk-related parameter is the linear-crosstalk contribution and is determined by the estimator; and at least one of a display to display at least one of said at least one linear-crosstalk-related parameter and an output to output at least one of said at least one linear-crosstalk-related parameter.

In accordance with another aspect, there is provided: a method for determining an interchannel relative polarization angle on multiplexed optical signals, wherein an optical signal-under-test and an adjacent optical signal of a channel adjacent said optical signal-under-test each have at least a data-carrying signal contribution within their respective optical signal bandwidths, the method comprising: acquiring, for each of a number nsop of varied state-of-polarization analysis conditions, at least one polarization-analyzed optical spectrum trace of said signal-under-test and said adjacent optical signal; determining at least one extrema trace from the acquired polarization-analyzed optical spectrum traces; and estimating said interchannel relative polarization angle between said signal contribution of said adjacent optical signal and said signal contribution of said signal-under-test using at least said at least one extrema trace.

In accordance with another aspect, there is provided a method for determining an in-band Amplified Spontaneous Emission (ASE) noise parameter on an optical signal-under-test having a data-carrying signal contribution, an ASE-noise contribution and an interchannel cross-talk contribution within its optical channel bandwidth, wherein said interchannel cross-talk contribution arises from an adjacent optical signal of an adjacent channel to the optical signal-under-test which has at least a data-carrying signal contribution within its optical signal bandwidth, the method comprising: acquiring at least one optical spectrum trace of said signal-under-test and said adjacent optical signal; estimating said interchannel cross-talk contribution of said adjacent optical signal in the optical channel bandwidth of said signal-under-test using at least one of said at least one optical spectrum trace and a trace obtained from said at least one optical spectrum trace; discriminating at least said signal contribution from said ASE-noise contribution on said signal-under-test using at least the estimated interchannel cross-talk contribution; and determining said in-band ASE-noise parameter on said signal-under-test using at least the discriminated ASE-noise contribution.

In accordance with another aspect, there is provided a method for determining an in-band Amplified Spontaneous Emission (ASE) noise parameter on an optical signal-under-test having a data-carrying signal contribution, an ASE-noise contribution and an interchannel cross-talk contribution within its optical channel bandwidth, wherein said interchannel cross-talk contribution arises from an adjacent optical signal of an adjacent channel to the optical signal-under-test which has at least a data-carrying signal contribution within its optical signal bandwidth, the method comprising: acquiring at least one optical spectrum trace of said signal-under-test and said adjacent optical signal; estimating said interchannel cross-talk contribution of said adjacent optical signal in the optical channel bandwidth of said signal-under-test using at least one of said at least one optical spectrum trace and a trace obtained from said at least one optical spectrum trace; discriminating at least said signal contribution from said ASE-noise contribution on said signal-under-test using at least the estimated interchannel cross-talk contribution; and determining said in-band ASE-noise parameter on said signal-under-test using at least the discriminated ASE-noise contribution.

It is noted that, in the context of this specification, reference is often made to adjacent channels to the SUT. It should be understood that adjacent channels may consist, for example, of adjacent channels in terms of conventional Wavelength Division Multplexing (WDM) or Dense WDM (DWDM) systems, which are generally multiplexed/demultiplexed on a single propagation mode of an optical fiber using optical-frequency (i.e. wavelength) multiplexers/demultiplexers well known in the art. When a SUT is demultiplexed at the end of the optical communication link, optical power within the optical channel bandwidth which arises from the adjacent channels, referred to herein as linear crosstalk, is superposed on the demultiplexed SUT and may have an impact on optical signal quality.

In the context of this specification the term "adjacent channel" should not be construed as necessarily being limited to a channel that is in closest spectral proximity ("nearest-neighbor") to a specified "side" (either the longer- or shorter-wavelength side) of the SUT, since optical power from a non-nearest-neighbor channel (spectrally located at least two channels away from the SUT) may also be present within the channel-under-test. In practice, the resulting linear-crosstalk-inducing optical power contribution is usually negligible compared with the optical power contribution arising from nearest-neighbor optical signals. Nevertheless, embodiments of this invention are applicable to characterization of linear crosstalk arising from a signal in more than one "perturbing" adjacent channel, even if not the nearest-neighbor channel, provided that the signal associated with this adjacent channel is a substantial contributor to linear crosstalk on the SUT.

As well, in most practical WDM systems, including DWDM systems, linear crosstalk contributions to the SUT are generally negligible if the perturbing adjacent data-carrying channel, whether or not a "nearest neighbor", is spectrally spaced from the SUT peak by more than five times the bandwidth of this adjacent channel. However, this condition should not be construed as being limitative.

The adjacent channels may also consist of adjacent ones of multiple carriers used in multi-carrier modulation schemes. Such plurality of channels/carriers may be multiplexed according to Nyquist Wavelength Division Multiplexing (N-WDM) (also referred to as "superchannels" in the scientific literature) or Optical Orthogonal Frequency-Division Multiplexing (OOFDM) for example. In those cases, each channel (also referred to as "sub-channels" or "carriers") of a superchannel will be considered herein to comprise a data-carrying signal contribution, even though a combination of channels may actually be used to carry the data. In such multi-carrier modulation schemes, channels within a same superchannel generally propagate concurrently along the same communication-link light path from end-to-end. Optical power within one sub-channel-under-test which arises from the adjacent sub-channels will be herein also considered as linear crosstalk.

It should be further appreciated that the applicability of this invention is not limited to WDM/DWDM signals propagating along the same "lowest-order" guiding mode of a singlemode optical fiber, but may also be advantageously employed in spatial multiplexing (also known as Space-Division-Multiplexing—SDM) transmission, particularly when combined with wavelength-division multiplexing, such as described, for example, in the paper "Spatial multiplexing for high capacity transport", by P. Krummrich, Journal of Optical Fiber Technology (2011). In particular, aspects of this invention may enable characterization of linear crosstalk arising from inter-modal leakage of signals propagating in higher-order propagation modes of a "multimode" fiber and/or from other cores in a "multi-core" fiber, provided that the linear-crosstalk-inducing signal have a central wavelength different than that of the SUT, but yet be sufficiently close in wavelength so as to be considered spectrally "adjacent". A person of ordinary skill in the art will understand that the embodiments described herein may be readily modified for SDM applications.

In this specification, the expression "trace" is not to be construed limitatively to data that are displayed graphically, but is intended to encompass data that are not displayed graphically but nonetheless used for any suitable purpose.

In this specification, the expression "data-carrying signal contribution" is intended to embrace a commercial data payload corresponding to a particular symbol rate or simulated data having approximately the same symbol rate, for instance.

In this specification, the expression linear-crosstalk-related parameter encompasses estimated or otherwise determined linear-crosstalk contribution, and parameters which can be estimated or otherwise determined based on the determined linear-crosstalk contribution, such as, for instance, relative state of polarization such as described in the description below, amplified spontaneous emission noise contribution when superposed on linear crosstalk contribution and discriminated therefrom, and optical signal-to-crosstalk ratio, to name a few examples.

In this specification, the expression "quasi-continuum" should be understood as effectively meaning "continuous" with practical spectral sampling resolution (with respect to the SUT bandwidth) and realistic instrumental limitations. Thus, for instance, in practical embodiments, not all acquired data samples are necessary, and the loss or lack of a few data samples will normally not adversely affect the measurement.

In this specification, reference is made to the "differential polarization response approach". It should be understood that this nomenclature can correspond to the Passive Polarization-Induced Discrimination (PPID) approach as described in International Patent Application Publication WO 2008/122123 A1 to Gariépy et al. (commonly owned by the Applicant). The technique referred to as the differential polarization response approach also includes variants of the PPID approach including the approach referred to as the "improved differential polarization response approach" in International Patent Application Publication WO 2011/020195 A1 to He et al. (also commonly owned by the Applicant).

BRIEF DESCRIPTION OF THE DRAWINGS

FIG. 8 is a flowchart illustrating a method for determining an interchannel relative state-of-polarization parameter characterizing adjacent non-polarization-multiplexed optical signals propagating in a common optical fiber.

Figure 1:
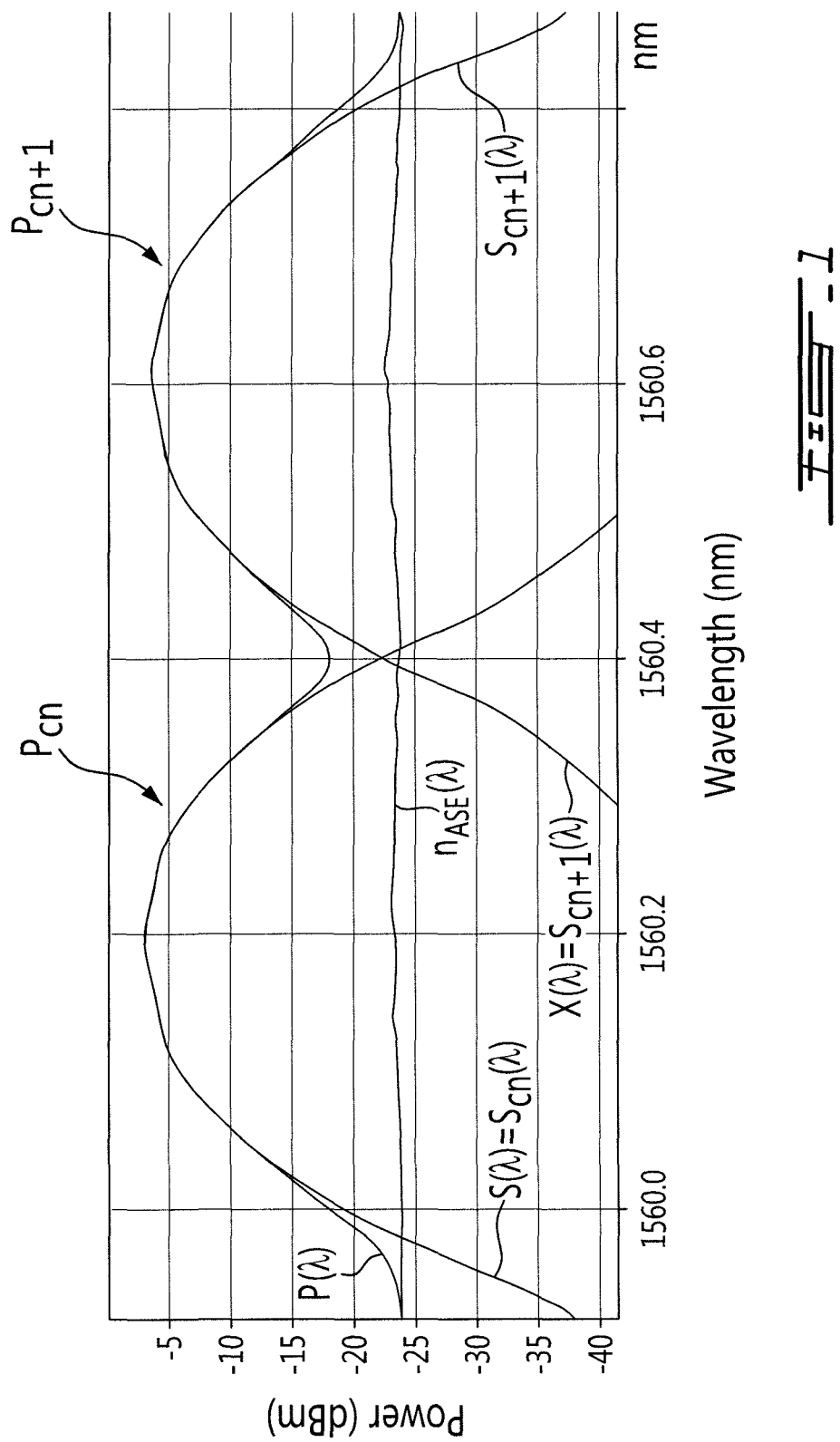
FIG. 1 is a graph illustrating the optical spectrum of an optical Signal-Under-Test (SUT) $p_{C_n}$ as well as the adjacent optical signal $p_{C_{n+1}}$ of an adjacent channel, along with the optical spectrum of the ASE noise and signal contributions to the SUT.

It should be appreciated that, for reasons of clarity of explanation, the apparent difference between nearly superposed traces illustrated in each of FIGS. 3, 4, 6, and 7 have been exaggerated.

It will be noted that throughout the appended drawings, like features are identified by like reference numerals.

DETAILED DESCRIPTION

The methods described herein relate to the characterization of an optical Signal-Under-Test (SUT) $p_{C_n}$ which is used in optical telecommunications to transmit data over, for instance, a Dense Wavelength Division Multiplexing (DWDM) optical channel. Throughout the present description, the SUT $p_{C_n}$ corresponds to one of the DWDM optical channels. The optical signal in the optical channel adjacent the optical channel of the SUT is referred to as the adjacent optical signal $p_{C_{n\pm1}}$. In their respective optical channel bandwidths, the SUT $p_{C_n}$ and the adjacent optical signals $p_{C_{n-1}}$, $p_{C_{n+1}}$ each normally include a data-carrying signal contribution $s_{C_n}(\lambda)$, $s_{C_{n-1}}(\lambda)$, $s_{C_{n+1}}(\lambda)$ and an ASE-noise contribution $n_{ASE}(\lambda)$. Within the optical channel bandwidth of the SUT, the portion of optical power of the signal contribution $s_{C_{n-1}}(\lambda)$, $s_{C_{n\pm1}}(\lambda)$ of adjacent optical signals constitutes a linear-crosstalk contribution $x(\lambda)$ to the SUT. Accordingly, within the optical channel bandwidth of the SUT, the optical power $p(\lambda)$ appearing at a given point along the optical communication link comprises a signal contribution $s(\lambda)=s_{C_n}(\lambda)$, an ASE-noise contribution $n_{ASE}(\lambda)$ and a linear crosstalk contribution $x(\lambda)=s_{C_{n-1}}(\lambda)+s_{C_{n+1}}(\lambda)$:

$$p(\lambda)=s(\lambda)+n_{ASE}(\lambda)+x(\lambda)=s_{C_n}(\lambda)+n_{ASE}(\lambda)+s_{C_{n-1}}(\lambda)+s_{C_{n+1}}(\lambda) \quad (1)$$

Normally, linear-crosstalk contributions caused by each of the adjacent optical signals $p_{C_{n-1}}$, $p_{C_{n+1}}$ may be considered and evaluated completely separately because, generally, in WDM systems, "leakage" of respective portions of the "blue" and "red" adjacent optical signals $p_{C_{n-1}}$, $p_{C_{n+1}}$ are limited to spectral regions within the SUT which are closest to their respective channels. Accordingly, there is generally negligible leakage of the blue and red adjacent optical signals $p_{C_{n-1}}$, $p_{C_{n+1}}$ into their respective opposite halves of the SUT optical channel bandwidth, and hence one may be disregarded when evaluating the other in its relevant spectral region.

Throughout this specification, the method is illustrated for clarity with reference only to the adjacent optical signal $p_{C_{n+1}}$ located on the red side (i.e. higher-wavelength side) of the SUT spectrum, i.e. disregarding the adjacent optical signal $p_{C_{n-1}}$ located on the blue side. However, it should be understood that same methods also may be applied in a straightforward fashion by one skilled in the art to undertake the characterization of linear crosstalk caused by the adjacent optical signal $p_{C_{n-1}}$ located on the "blue side" of the SUT.

As mentioned hereinabove, optical power arising from the non-"nearest-neighbor" optical signals $p_{C_{n\pm2}}$, $p_{C_{n\pm3}}$, ... (spectrally separated from the SUT by at least one intervening channel) may also be present within the channel-under-test. However, in most practical cases, this power will be negligible compared to the optical power arising from adjacent optical signals $p_{C_{n\pm1}}$. Accordingly, examples are given with a nearest-neighbor "perturber" signal, and one skilled in the art will readily appreciate that the methods presented herein may be extended to embrace the characterization of linear crosstalk caused by such further channels.

Also, throughout this specification, although the SUT refers to a particular signal in a particular channel having a defined central wavelength, it should be understood that this method can be subsequently applied to other channels, e.g. adjacent channel $p_{C_{n+1}}$, which would then be denoted as the SUT in this subsequent analysis. For instance, the optical channel bandwidth of adjacent channel $p_{C_{n+1}}$, would also encompass a signal contribution corresponding to $s_{C_{n+1}}(\lambda)$ (henceforth the SUT), an ASE-noise contribution $n_{ASE}(\lambda)$, and linear-crosstalk contributions from $s_{C_n}(\lambda)$ and $s_{C_{n+2}}(\lambda)$, if present, and so forth to any of potentially numerous channels of a WDM (or, under certain circumstances, a combined WDM/SDM) system.

Other non-ASE noise contributions, such as carrier-leakage noise and signal depolarization, may also be present on the SUT and the adjacent channel. Although other non-ASE noise contributions will not be specifically addressed in the description hereinafter, it should be understood that, if significant, such other non-ASE noise contributions may be taken into account in the methods described herein. For example, such other non-ASE noise may be characterized using methods described in International Patent Application no PCT/CA2012/050089 to He et al., filed 16 Feb. 2012, and which is commonly owned by the applicant and which is hereby incorporated by reference. For instance, as described in PCT/CA2012/050089, if a significant degree of polarization mode dispersion (PMD) is present in the optical fiber, it may lead to an apparent partial depolarization of the data-carrying signal contribution of the SUT if the inherent filter spectral response of the optical spectrum analysis device, $f(\lambda)$, is sufficiently large. For simplicity in the description of aspects of the present invention, it is assumed that such PMD-induced partial depolarization is negligible.

The optical spectrum trace $p(\lambda)$ of the SUT p represents conceptually the true wavelength dependence of an acquired signal if the optical spectrum analysis device were to have unlimited resolution. In practice, an optical spectrum analysis device such as an Optical Spectrum Analyzer (OSA) can actually measure the SUT p convolved with the inherent filter spectral response of the OSA, $f(\lambda)$. More generally, the optical spectrum trace $P(\lambda)$ may be defined as the spectrally-resolved optical power of the SUT p, for any effective filter response (e.g. as may be convoluted computationally in the subsequent processing, or deliberately induced by a limited electronic detection bandwidth). Within the optical bandwidth corresponding to the channel bandwidth CBW, the optical spectrum trace $P(\lambda)$ includes a signal contribution $S(\lambda)$, an ASE-noise contribution $N_{ASE}(\lambda)$ and a linear-crosstalk contribution $X(\lambda)$, which appear as being merged in the optical spectrum trace $P(\lambda)$:

$$P(\lambda)=p(\lambda)*f(\lambda)=[s(\lambda)+n_{ASE}(\lambda)+x(\lambda)]*f(\lambda)=S(\lambda)+N_{ASE}(\lambda)+X(\lambda) \quad (2)$$

where "*" denotes the convolution operation.

However, because they optically appear on $P(\lambda)$ as being merged, $S(\lambda)$, $N_{ASE}(\lambda)$ and $X(\lambda)$ cannot be separately acquired using an OSA. The methods described herein are used to discriminate, in acquired optical spectrum traces $P(\lambda)$, the signal contribution $S(\lambda)$, the noise contribution $N(\lambda)$ and the linear-crosstalk contribution $X(\lambda)$ from one another within the optical channel bandwidth of the SUT, in order to characterize the ASE noise and/or the linear crosstalk on the SUT.

Although only two DWDM channels are shown in FIG. 1, wavelength division multiplexing typically comprises a greater number of DWDM channels falling within the optical communication spectrum. It should thus be kept in mind that another adjacent optical signal $p_{Cn-1}$ (not shown) is typically present on the blue side of the SUT $p_{Cn}$. As mentioned hereinabove, in order to simplify the present description, only adjacent optical signal $p_{Cn+1}$ will be considered such that $s_{Cn-1}(\lambda)$ is disregarded and $x(\lambda)=s_{Cn+1}(\lambda)$.

For a DWDM system employing "channel-selective" optical filtering means disposed between the transmitters and respective receivers, an optical channel is specified as a spectral bandwidth over which an optical signal propagating through the link (from transmitter to receiver) exhibits minimal loss, i.e. the channel bandwidth, allocated for the transmission of an optical signal in a WDM transmission scheme. The optical-signal bandwidth is defined as the actual width of the signal peak, i.e. the bandwidth over which the signal contribution is non-negligible. The channel bandwidth may be larger than, approximately equal to, or even narrower than the signal bandwidth, depending on the density of the DWDM channels, the effective bandwidth of the optical channel, and the signal transmission rate for a given transmission scheme.

Figure 2:
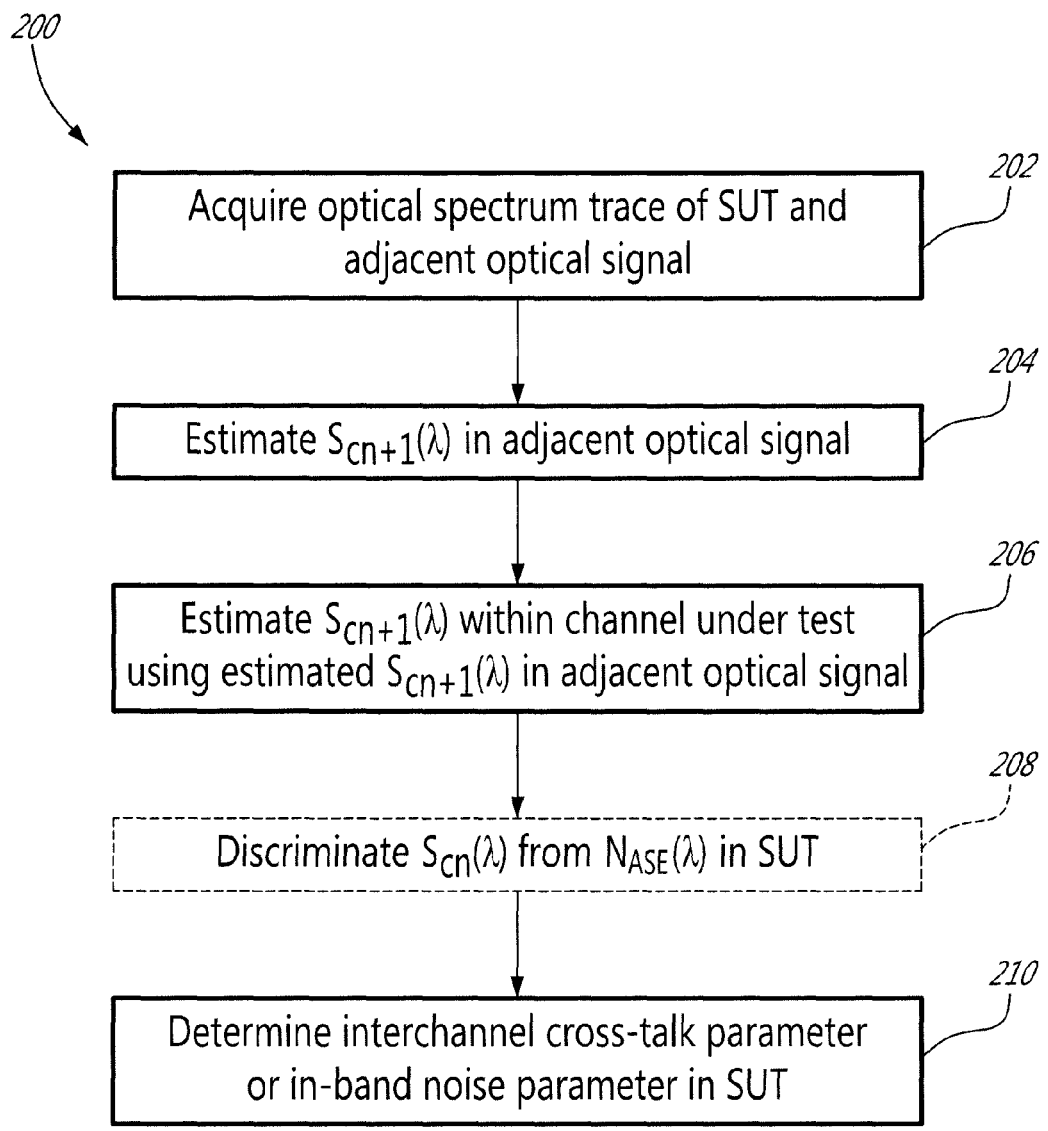
FIG. 2 is a flowchart illustrating a method for determining an linear-crosstalk-related parameter or an in-band ASE-noise parameter on a SUT, in accordance with one embodiment.
Figure 3:
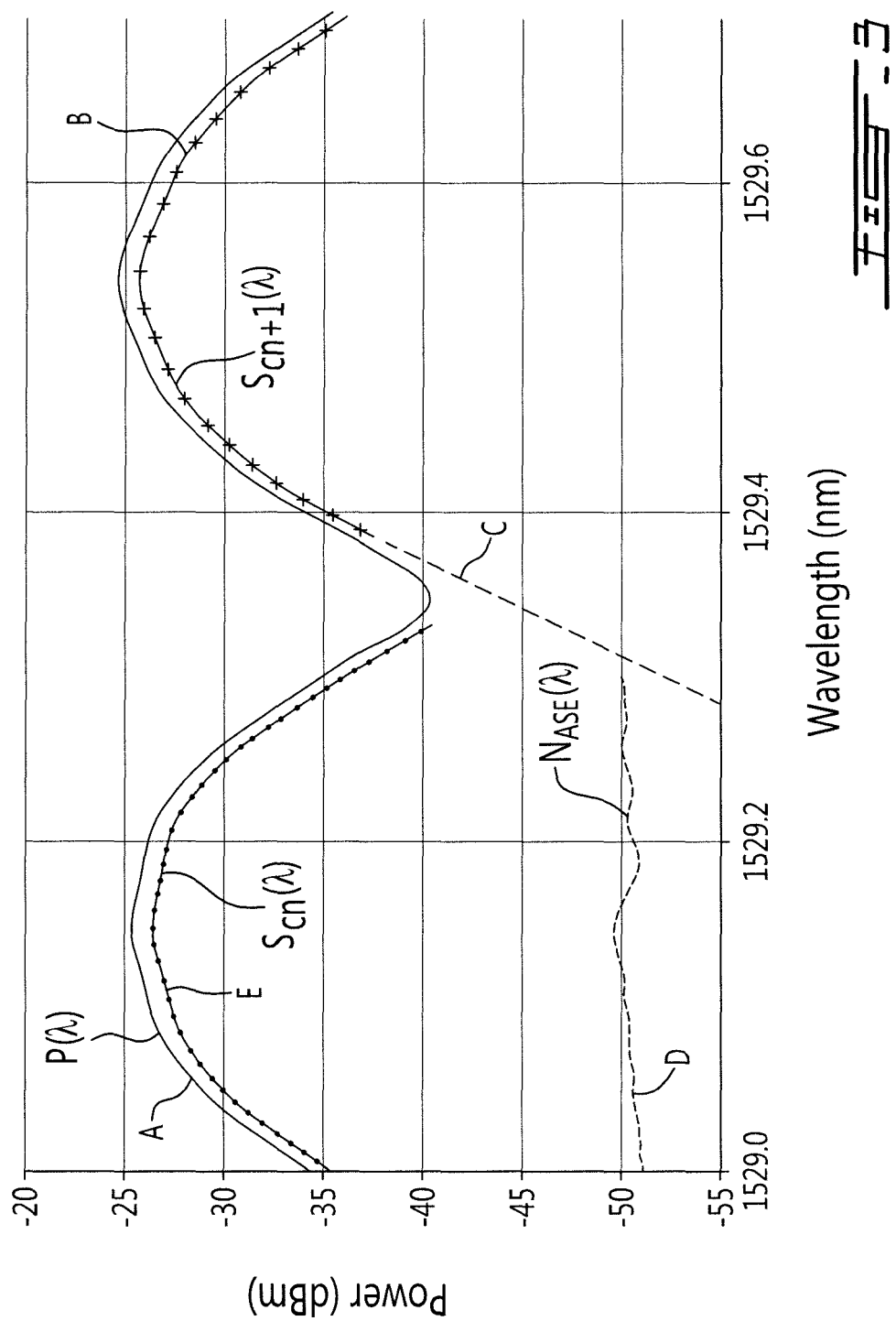
FIG. 3 is a graph showing an acquired optical spectrum trace P(λ) (trace A) of the SUT and the adjacent optical signal, as well as traces obtained by the method of FIG. 2 for determining a linear crosstalk parameter or an in-band ASE-noise parameter on the SUT, wherein trace B is the estimated signal contribution of the adjacent optical signal within the adjacent channel, trace C is the estimated signal contribution of the adjacent optical signal within the optical channel bandwidth of the SUT, and traces D and E are respectively the noise contribution and the signal contribution to the SUT as discriminated from one another on the acquisition optical spectrum trace (trace A) within the optical channel bandwidth of the SUT.

FIGS. 2 and 3 illustrate a method 200 for determining at least one linear-crosstalk-related parameter, of which one is a linear-crosstalk contribution $X(\lambda)$, in accordance with one embodiment. As explained above, within its optical channel bandwidth CBW, the SUT comprises a signal contribution $S(\lambda)$, an ASE-noise contribution $N_{ASE}(\lambda)$ and a linear-crosstalk contribution $X(\lambda)$. Characterization of the SUT may comprise determination of an in-band ASE-noise parameter, such as the ASE-only Optical Signal-to-Noise Ratio (OSNR) for example, which may be defined as the ratio of signal power to the ASE-noise power as measured with a resolution bandwidth of 0.1 nm:

$$ASE\text{-only } OSNR = 10 \log_{10}\left(\frac{\int_{CBW} s(\lambda)d\lambda}{\frac{\alpha 1nm}{RBW}\int_{RBW}N_{ASE}(\lambda)d\lambda}\right) \quad (3)$$

wherein RBW is the measurement resolution bandwidth. Alternately, or in addition, characterization of the SUT may comprise determination of a linear-crosstalk-related parameter such as the interchannel relative SOP between the SUT and the adjacent optical signal, referred to herein as the "interchannel relative SOP" or an optical-signal-to-crosstalk ratio, as defined hereinafter.

If one of linear-crosstalk-related parameters to be determined is an in-band ASE-noise parameter on the SUT $p_{Cn}$, method 200 provides for separating the interchannel-crosstalk contribution $X(\lambda)$ from ASE-noise contribution $N_{ASE}(\lambda)$ to provide a better characterization of in-band noise.

If the parameter to be determined is another linear-crosstalk-related parameter, the method 200 also provides for separating the linear-crosstalk contribution $X(\lambda)$ from the ASE noise contribution $N_{ASE}(\lambda)$ to provide a characterization of the linear-crosstalk contribution to noise on the SUT.

In step 202, at least one optical spectrum trace $P(\lambda)$ (trace A in FIG. 3) of the SUT and the adjacent optical signal is acquired. The optical spectrum trace $P(\lambda)$ may be obtained using measurement means capable of discriminating optical frequencies encompassed within the optical bandwidth of the SUT and the adjacent optical signal. Such measurements are typically obtained using a commercially available OSA. In order to acquire both the SUT and the adjacent optical signal in a single optical spectrum trace, the acquisition should generally be performed upstream to the demultiplexing thereof.

As will be detailed hereinafter, in the case of non-polarization-multiplexed signals, the acquisition of multiple optical spectrum traces under varied State-Of-Polarization (SOP) analysis conditions may be useful in order to allow the discrimination of signal and noise contributions using polarization-nulling methods or differential polarization response methods such as described in International Patent Application Publication WO 2008/122123 A1 to Gariépy et al.; and WO 2011/020195 A1 to He et al., both commonly owned by the Applicant and hereby incorporated by reference. However, as will be explained hereinafter, the method of FIG. 2 also applies in the case of polarization-multiplexed signals. In this case, there is no need for multiple acquisitions under varied SOP analysis conditions.

As will be discussed hereinafter, when multiple acquired optical spectrum traces are acquired, they may be combined and processed to generate one or more "composite" traces, for example, of the SUT and/or the adjacent optical signal. A composite trace may comprise an extrema trace, as will be described below. However, in certain embodiments, an extrema trace need not necessarily be composed of data elements arising from multiple acquired spectrum traces, nor from mathematical combinations of certain traces, but may be a particular selected one of multiple acquired optical spectrum traces.

In step 204, using the acquired optical spectrum trace(s), the signal contribution $S_{Cn+1}(\lambda)$ of the adjacent optical signal within the adjacent channel is estimated (trace B in FIG. 3). For example, in one embodiment, it can be estimated directly from an acquired non-polarization-analyzed optical spectrum trace of the adjacent optical signal by assuming a negligible ASE-noise contribution. In another embodiment, a polarization-nulling method or a differential polarization response method may be used to discriminate the signal contribution $S_{Cn+1}(\lambda)$ from the noise contribution $N_{ASE}(\lambda)$ in the adjacent optical signal within the adjacent channel. Other suitable embodiments will be described hereinafter as part of Example 1, Example 2 and Example 3.

In step 206, the signal contribution $S_{Cn+1}(\lambda)$ of the adjacent optical signal within the optical channel bandwidth of the SUT is estimated (trace C in FIG. 3). This constitutes a linear-crosstalk contribution $X(\lambda)$ to the SUT. Linear-crosstalk contribution $X(\lambda)$ cannot be easily discriminated from the signal contribution $S_{Cn}(\lambda)$ and the ASE-noise contribution $N_{ASE}(\lambda)$ on directly-acquired and/or extrema optical spectrum trace(s) of the SUT using prior art polarization-nulling or differential polarization response methods. Accordingly, the linear-crosstalk contribution $X(\lambda)$ is estimated based on the optical spectrum trace of the signal contribution $S_{Cn+1}(\lambda)$ of the adjacent optical signal estimated in step 204 within the adjacent channel. The signal contribution $S_{Cn+1}(\lambda)$ within the optical channel bandwidth of the SUT is typically estimated by extrapolation of $S_{Cn+1}(\lambda)$ as estimated over the adjacent channel, on the optical channel bandwidth of the SUT. Extrapolation may be performed using mathematical extrapolation, e.g. linear extrapolation on a logarithmic scale (e.g. in dB units), or using a curve-fit such as a Gaussian-fit or a curve-fit of a predetermined shape of the signal contribution on the $S_{Cn+1}(\lambda)$ as determined, for example, from the known modulation format and the WDM multiplexer filtering shape.

Step 208 is optional and is performed if the parameter to be determined is an in-band ASE-noise parameter such as the ASE-only OSNR. In this case, in step 208, the noise (trace D in FIG. 3) and signal $S_{Cn}(\lambda)$ (trace E in FIG. 3) contributions are mutually discriminated on the optical spectrum trace $P(\lambda)$ within the optical channel bandwidth of the SUT. In the case of non-polarization-multiplexed signals, which are polarized, this can be accomplished using methods known in the art, such as polarization-nulling methods, differential polarization response methods, or other methods such as described in International Patent Application Publication WO 2008/122123 A1 to Gariépy et al. which is commonly owned by the Applicant and hereby incorporated by reference. It is however noted that the noise contribution (trace D) as discriminated using a differential polarization response method includes both the ASE-noise contribution $N_{ASE}(\lambda)$ and a portion of linear crosstalk $X(\lambda)$. The ASE-only noise contribution $N_{ASE}(\lambda)$ is then determined by removing the estimated linear-crosstalk contribution $X(\lambda)$ from the discriminated noise contribution (trace D). It is also noted that, in the case of non-polarization-multiplexed signals, in order to properly remove the linear crosstalk contribution $X(\lambda)$, the interchannel relative SOP, i.e. between the SUT and the adjacent optical signal, should be determined. The interchannel relative SOP may be evaluated by comparing directly-acquired and/or extrema polarization-analyzed optical spectrum traces for example, as will be exemplified in more detail hereinafter.

In step 210, the linear-crosstalk-related parameter(s) to be determined, which may include the in-band ASE-noise parameter(s), are calculated and outputted. For example, if the parameter to be determined is ASE-only OSNR, such parameter is obtained using the signal $S_{Cn}(\lambda)$ and ASE-noise $N_{ASE}(\lambda)$ contributions as discriminated in step 208. If the parameter to be determined is a linear-crosstalk-related parameter, such parameter is obtained using the estimated linear-crosstalk contribution $X(\lambda)$, the interchannel relative SOP or a combination of the two. When the linear-crosstalk-related parameter is an interchannel relative SOP parameter, such as the relative angle θ on the Poincaré sphere between the SOP vectors of the SUT and the adjacent crosstalk-inducing signal, this parameter may be useful, for example, in the case of DWDM communication systems employing "polarization interleaving". Polarization interleaving involves the transmission of spectrally adjacent ("nearest-neighbor") signals whose respective SOPs are mutually orthogonal (i.e. cross-polarized), in order to minimize impairments induced by crosstalk, including linear crosstalk. In this case, the interchannel relative SOP parameter may be outputted in order to monitor the actual cross-polarization of the adjacent channels corresponding to these signals. It is noted that, if only the interchannel relative SOP parameter is to be outputted, there is no need to perform steps 204 and 206.

For example, the linear-crosstalk-related parameter(s) may be outputted by graphical display, in printed form, by generating an electrical signal or by storing in memory for later retrieval. The linear-crosstalk-related parameter(s) and/or the in-band ASE-noise parameter(s) may also be outputted graphically or numerically using a display unit or a printer, along with acquired or processed optical spectrum traces such as $P(\lambda)$, $S(\lambda)$, $N_{ASE}(\lambda)$ and $X(\lambda)$ for example. Other parameters may also be displayed or otherwise output in a graphical or numerical form.

Figure 5:
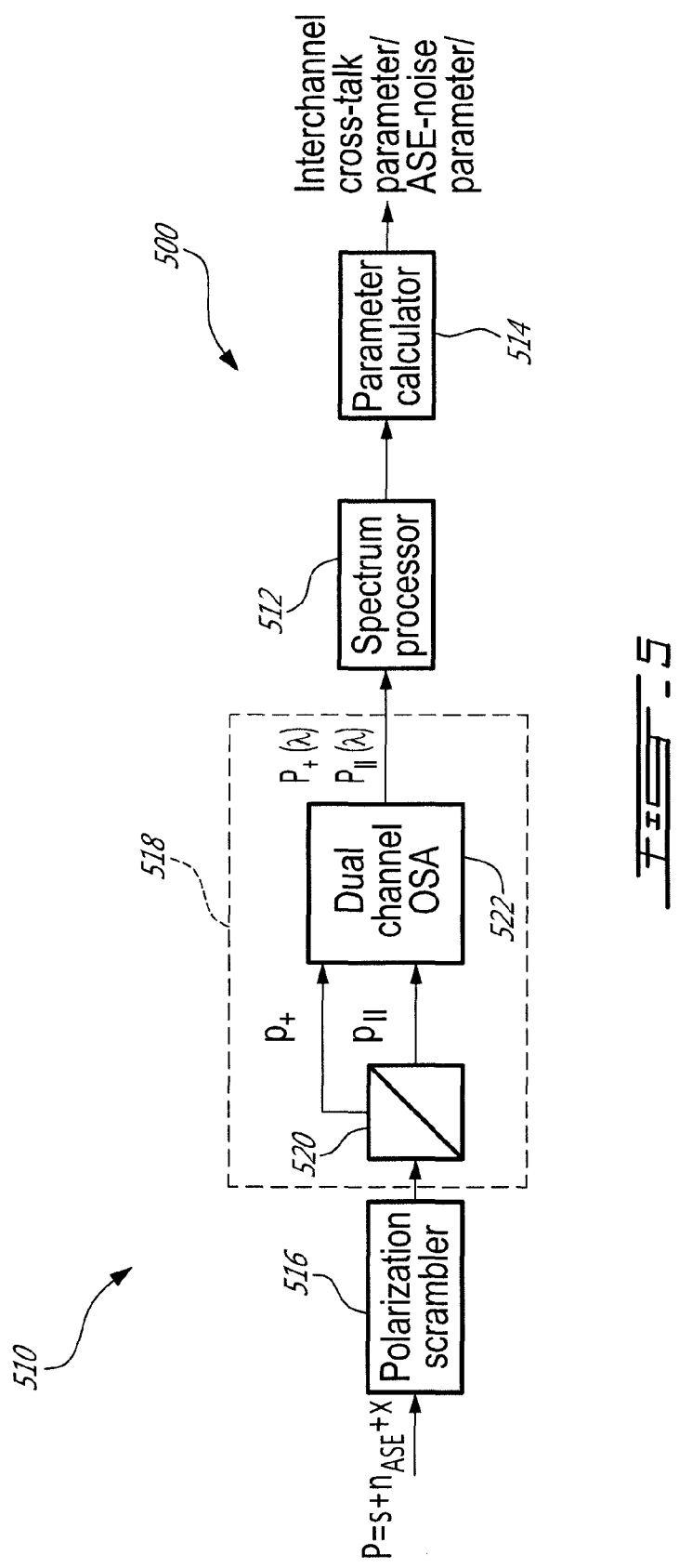
FIG. 5 is a block diagram showing the main parts of an apparatus for determining linear-crosstalk-related parameter or an in-band ASE-noise parameter on a SUT by employing a polarization-sensitive spectrum analysis.

The examples which follow have been realized, unless otherwise indicated, using a grating-based optical spectrum analyzer. FIG. 5 illustrates the main components of a system 500 suitable for conducting the method of these embodiments.

The system 500 receives a SUT p and comprises a Varied-SOP polarization-sensitive Optical Spectral Analyzer (VSOP-OSA) 510, a spectrum processor 512 and a parameter calculator 514. The VSOP-OSA 510 comprises a polarization controller, in this case a polarization scrambler 516, disposed in the optical path before a polarization-diversity OSA 518 (see, for example, the polarization-diversity OSA described in commonly-owned U.S. Pat. No. 6,636,306 and commercially available as the FTB-5240 series of optical spectrum analyzers manufactured and marketed by EXFO Inc.) comprising a combination of a polarization beam splitter 520 and a dual-channel Optical Spectrum Analyzer (OSA) 522. For this particular grating-based design, a singlemode fiber disposed in the output focal plane serves as the "output slit", thereby defining an effective resolution bandwidth (i.e. inherent filter function) of the OSA. The polarization beam splitter 520 serves as two polarization analyzers, as it apportions, from light incident thereupon, two orthogonally-analyzed samples $p_\perp$ and $p_\parallel$ of the SUT p. The polarization scrambler 216 is typically controlled by a control unit (not shown) which causes the SOP analysis conditions to be varied among acquisitions of pairs of samples $p_\perp$ and $p_\parallel$. The polarization-diversity OSA can acquire two optical spectrum traces at the same time, i.e. a set of two series of optical powers corresponding to narrow spectral portions centered about closely-spaced wavelengths of a quasi-continuum of wavelengths encompassing wavelengths corresponding to at least part of the SUT and contiguous wavelengths intermediate the SUT and the adjacent optical signal. As mentioned hereinabove, these two simultaneously acquired traces $p_\perp$ and $p_\parallel$, correspond to respective polarization-analysis conditions for which the respective SOPs are mutually orthogonal. It should be noted that the traces $p_\perp$ and $p_\parallel$ may be summed to yield a "total-power" composite trace proportional to the non-polarization-analyzed wavelength-dependent optical power.

It should be appreciated that the optical spectrum can be analyzed by means other than a polarization-diversity OSA, such as other polarization-sensitive spectrum analyzers providing polarimetric information on the SUT for example. For instance, in one embodiment, the polarization beam splitter 520 is replaced by a linear polarizer, such that only one polarization-analyzed sample $p_\parallel$ is acquired for each condition of the polarization scrambler 516. Usually a second, non-polarization-analyzed (i.e. polarization independent) trace is acquired at the same time, e.g. via a coupler disposed "upstream" from the polarization analyzer, to provide normalization of each of the polarization-analyzed samples $p_\parallel$ so acquired.

Alternatively, the polarization-diversity OSA may be replaced by a wavelength-swept spectrally-selective polarimeter. For instance, such a polarimeter could provide, in a known manner, the SOP and DOP of the SUT p from the four optical spectrum traces, acquired during a single sweep, of all four wavelength-dependent Stokes parameters derived from simultaneous but different polarization-analysis measurements corresponding to linearly-independent state-of-polarization analysis conditions.

It is further envisaged that the polarization-sensitive OSA could be a coherent OSA, based on detected rf beating between a swept-tuned optical local oscillator (defining the ultimate resolution bandwidth) and the SUT. The SOP of the laser-based local oscillator acts effectively to polarization analyze $p_\parallel$ of the SUT. (Such an OSA is described, for example, in D. Baney et al, "Coherent Optical Spectrum Analyzer", IEEE Photonics Technology Letters, vol 14, no. 3, pp. 355-357 (2002).)

Example 1

One embodiment of method 200 of FIG. 2 is now described with reference to FIGS. 2, 4 and 5. The method of this embodiment determines an in-band ASE-noise parameter, in addition to another linear-crosstalk-related parameter. Accordingly, the ASE-noise contribution to the SUT is determined, which requires steps that may not necessarily be needed in the case of determination of other linear-crosstalk-related parameters.

In this embodiment, signal and noise contributions are discriminated on the SUT using a special case of the differential polarization response methods wherein a very large number $n_{SOP}$ of pairs of polarization-analyzed optical spectrum traces of the SUT and the adjacent optical signal are acquired under varied SOP analysis conditions (step 202), such that the data-carrying signal contribution to the SUT may be assumed to be substantially completely suppressed over a portion of the signal bandwidth, preferably outside of the 3-dB signal width, on at least one of the acquired polarization-analyzed optical spectrum traces.

The OSA 522 simultaneously acquires two polarization-analyzed optical spectrum traces ($P_\perp(\lambda)$ and $P_\parallel(\lambda)$) respectively corresponding to samples $p_\perp$ and $p_\parallel$. The spectrum processor 512 receives the two traces $P_\perp(\lambda)$, $P_\parallel(\lambda)$ and discriminates the signal contribution s, the ASE-noise contribution $n_{ASE}$ and the linear-crosstalk contribution x. The parameter calculator 514 evaluates, from the discriminated contributions, in-band ASE-noise parameter(s) and/or other linear-crosstalk-related parameter(s) to be determined.

It should be appreciated that the system illustrated in FIG. 5 is given as an illustrative example only of a suitable system for applying the method of this embodiment and that components or combination of components described may be replaced by any other components or combination of components which performs the functions required for their application.

Now, in order to perform a polarization-sensitive spectrum analysis of the SUT, a plurality of pairs of mutually-orthogonal polarization-analyzed optical spectrum traces $P_\parallel(\lambda)$, $P_\perp(\lambda)$ of the SUT p are acquired (step 202) by varying the SOP analysis conditions of the VSOP-OSA 510. In accordance with the system 500 of FIG. 5, this is performed by generating, by means of the polarization scrambler 516, a number $n_{SOP}$ of different SOPs from the SOP of the SUT incident thereon. These different SOPs are then input into the polarization-diversity OSA 518 to provide a pair of mutually-orthogonal polarization-analyzed optical spectrum traces $P_\parallel(\lambda)$ and $P_\perp(\lambda)$:

$$P(\lambda)=P_{sum}(\lambda)=P_\parallel(\lambda)+P_\perp(\lambda)=p(\lambda)*f(\lambda) \qquad (4a)$$

$$P_{sum}(\lambda)=[s(\lambda)+n_{ASE}(\lambda)+c_L(\lambda)]*f(\lambda)=S(\lambda)+N_{ASE}(\lambda)+X(\lambda) \qquad (4b)$$

where $P_{sum}(\lambda)$ is the sum of optical spectrum traces $P_\parallel(\lambda)$ and $P_\perp(\lambda)$, referred to herein as the "total optical spectrum trace", and where $S(\lambda)$, $N_{ASE}(\lambda)$ and $X(\lambda)$ respectively correspond to optical spectrum traces of the signal, ASE-noise and linear-crosstalk contributions in $P_{sum}(\lambda)$, as would be acquired by an OSA having a filter function $f(\lambda)$.

From the $n_{SOP}$ pairs of acquired optical spectrum traces, composite extrema traces, i.e. a composite minima trace $P_{min}(\lambda)$ and a composite maxima trace $P_{max}(\lambda)$, are determined. The composite minima $P_{min}(\lambda)$ and maxima $P_{max}(\lambda)$ traces are determined from the $n_{SOP}$ acquired pairs of mutually-orthogonal data sets by selecting for each wavelength $\lambda_i$, among all $n_{SOP}$ acquired pairs of traces, respectively the minimum and maximum power. Data are stored as the total-power optical spectrum trace $P_{sum}(\lambda)$ and the composite extrema traces $P_{min}(\lambda)$ and $P_{max}(\lambda)$ where $$P_{sum}(\lambda)=P_\parallel(\lambda)+P_\perp(\lambda) \qquad (5a)$$

$$P_{min}(\lambda)=\min\{P_\parallel(\lambda);P_\perp(\lambda)\}_{SOP} \qquad (5b)$$

$$P_{max}(\lambda)=\max\{P_\parallel(\lambda);P_\perp(\lambda)\}_{SOP} \qquad (5c)$$

where $\min\{\bullet\}_{SOP}$ and $\max\{\bullet\}_{SOP}$ indicate "min-selecting" and "max-selecting" operations on the set of values for different SOPs at each individual wavelength.

If a sufficiently large number $n_{SOP}$ of pairs of polarization-analyzed optical spectrum traces are acquired and that non-idealities of the polarization beam splitter 520 extinction ratio can be considered negligible, it may be assumed that, for each wavelength within its bandwidth, the signal contribution $S(\lambda)$ is completely suppressed on one of the acquired traces and that there is therefore no residual signal contribution in the composite minima $P_{min}(\lambda)$. In this case, composite extrema traces $P_{min}(\lambda)$ and $P_{max}(\lambda)$ effectively represent:

$$P_{max}(\lambda)=S(\lambda)+0.5N_{ASE}(\lambda)+\cos^2(\theta/2)X(\lambda) \qquad (6)$$

$$P_{min}(\lambda)=0.5N_{ASE}(\lambda)+\sin^2(\theta/2)X(\lambda) \qquad (7)$$

where θ is the relative angle between the SOP vectors of the SUT and the adjacent optical signal on the Poincaré sphere, which is not known a priori. In this embodiment, it is assumed for simplicity that the signal contribution $S(\lambda)$ is substantially polarized, that the ASE-noise contribution $N_{ASE}(\lambda)$ is substantially unpolarized and that the linear crosstalk contribution $X(\lambda)$ is substantially polarized over the optical channel bandwidth. It is however noted that, in other embodiments, signal depolarization and ASE-noise polarization may be taken into account and characterized in cases where it cannot be assumed negligible.

From the constructed composite extrema traces, a spectrally-resolved trace of the signal contribution $S_{Cn+1}(\lambda)$ to the adjacent optical signal is estimated (step 204) within the adjacent channel. In this embodiment, the signal contribution $S_{Cn+1}(\lambda)$ is estimated using the total-power optical spectrum trace $P_{sum}(\lambda)$ as obtained over the adjacent channel, from which a first estimation of the ASE-noise contribution $N_{ASE}(\lambda)$ is removed, as will now be described.

The first estimation of the ASE-noise contribution $N_{ASE}(\lambda)$ is obtained by first assuming a negligible linear-crosstalk contribution $X(\lambda)$ compared to the signal contribution $S(\lambda)$ in a spectral region corresponding to the central portion of the channel-under-test where the linear crosstalk contribution may be considered negligible compared to the ASE-noise contribution. In this embodiment, the first estimation is performed at or close to the peak wavelength $\lambda_{peak}$ of the SUT. In this case, from Equations (6) and (7), the signal contribution $S(\lambda_{peak})$ and the ASE-noise contribution $N_{ASE}(\lambda_{peak})$ may be discriminated in the total-power optical spectrum trace $P_{sum}(\lambda)$ as follows:

$$N_{ASE}(\lambda_{peak})=2P_{min}(\lambda_{peak}) \quad (8)$$

$$S(\lambda_{peak})=P_{sum}(\lambda_{peak})-N_{ASE}(\lambda_{peak}) \quad (9)$$

By assuming a uniform ASE-noise over the channel-under-test and the adjacent channel, i.e. $N_{ASE}(\lambda)=N_{ASE}(\lambda_{peak})$, which corresponds to the first estimation of the ASE-noise contribution, and, to a first approximation, neglecting any linear crosstalk contribution from the SUT on the adjacent channel. Then, over the adjacent channel, $$S_{Cn+1,E}(\lambda)=P_{sum}(\lambda)-N_{ASE}(\lambda_{peak}) \quad (10)$$

It should be noted that, in other embodiments, calculations herein performed using the total-power optical spectrum trace $P_{sum}(\lambda)$ may be modified to be carried out using $P_{max}(\lambda)$ from which the ASE-noise contribution is removed:

$$S_{Cn+1,E}'(\lambda)=P_{max}(\lambda)-0.5N_{ASE}(\lambda_{peak}) \quad (11)$$

Alternately, the signal contribution may be estimated over the adjacent channel using differential polarization response methods:

$$S_{Cn+1,E}''(\lambda)=2P_{max}(\lambda)-P_{sum}(\lambda) \quad (12)$$

The signal contribution $S_{Cn+1}(\lambda)$ to the adjacent optical signal within the channel-under-test, i.e. the linear crosstalk contribution $X(\lambda)$, is then estimated (step 206) by linearly extrapolating on a logarithmic scale (e.g. in dB units) and near the interchannel crossing point, the signal contribution $S_{Cn+1,E}(\lambda)$ estimated in step 204.

Figure 4:
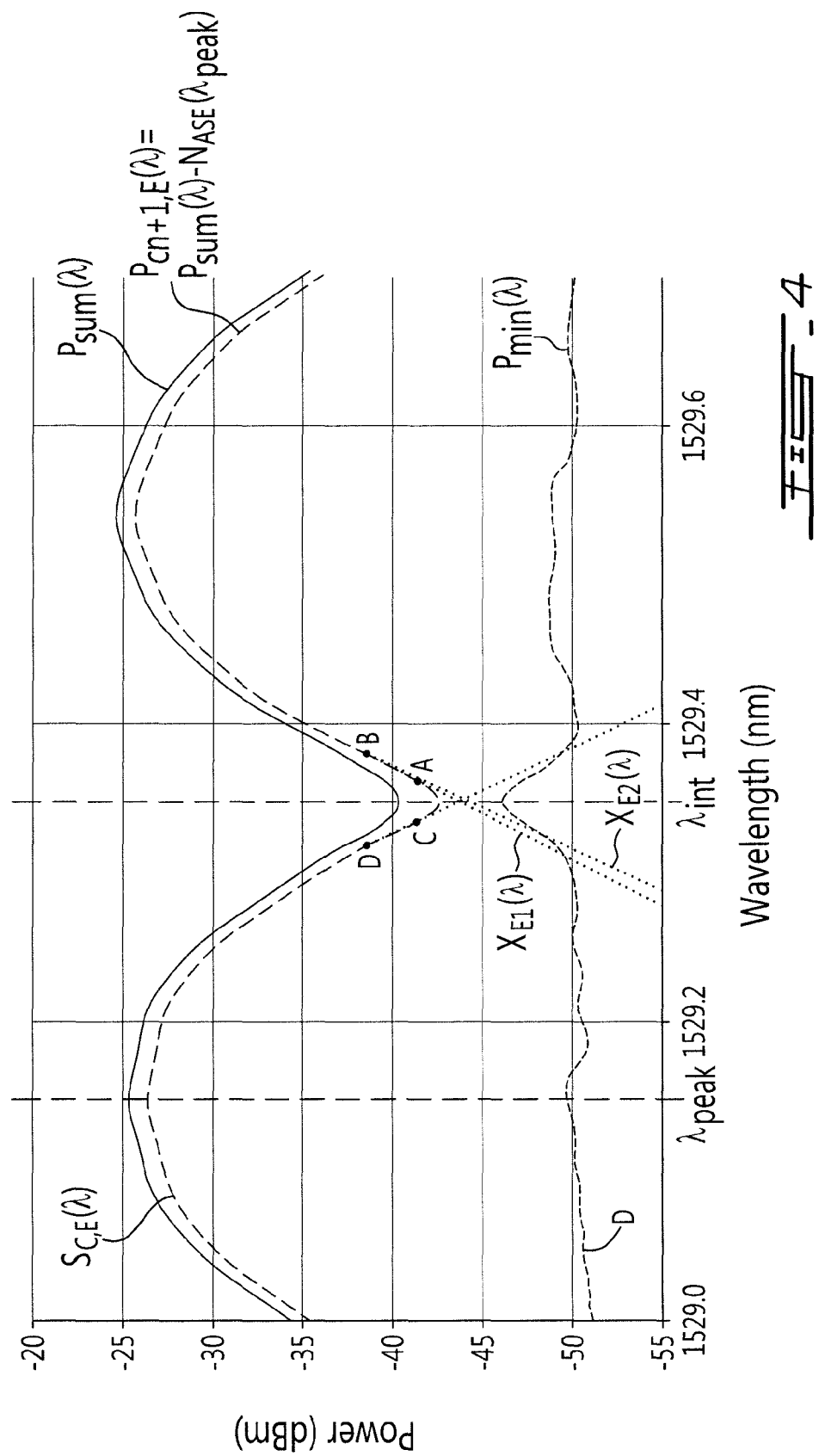
FIG. 4 is a graph illustrating one embodiment of a method for estimating the linear-crosstalk contribution in the SUT in accordance with Example 1 of the method of FIG. 2.

Now, referring to FIG. 4, this process is described in more detail.

The extrapolation is performed by first selecting two points, A and B, on the estimated signal contribution $S_{Cn+1,E}(\lambda)$ from which the extrapolation is to be performed. In this embodiment, points A and B are selected by:

1—Defining an interchannel crossing point $\lambda_{int}$ between the SUT and the adjacent optical signal where $P_{sum}(\lambda)$ is minimized and finding the power value $S_{Cn+1,E}(\lambda_{int})$ of the estimated signal contribution $S_{Cn+1,E}(\lambda)$ at the interchannel crossing point $\lambda_{int}$;

2—Finding, on the adjacent-signal side, the point (point A) on the estimated signal contribution $S_{Cn+1,E}(\lambda)$ which corresponds to 3 dB over $S_{Cn+1,E}(\lambda_{int})$:

$$S_{Cn+1,E}(\lambda_A)=S_{Cn+1,E}(\lambda_{int})+3 \text{ dB};$$

3—Finding, on the adjacent-signal side, the point (point B) on the estimated signal contribution $S_{Cn+1,E}(\lambda)$ which corresponds to 4 dB over $S_{Cn+1,E}(\lambda_{int})$:

$$S_{Cn+1,E}(\lambda_B)=S_{Cn+1,E}(\lambda_{int})+4 \text{ dB}; \text{ and}$$

4—Linearly extrapolating on a logarithmic scale (e.g. in dB units) the estimated signal contribution $S_{Cn+1,E}(\lambda)$ over the channel-under-test from the selected points A and B, which provides a first-iteration estimation of the linear crosstalk contribution $X_{E1}(\lambda)$.

It is of course possible to use this first-iteration estimation $X_{E1}(\lambda)$ as the estimated linear crosstalk contribution, but this first-iteration estimation $X_{E1}(\lambda)$ does not take into account linear crosstalk originating from the SUT on the adjacent channel. In order to better estimate the linear crosstalk contribution $X(\lambda)$ on the SUT, the signal contribution $S_{Cn}(\lambda)$ is also estimated within the channel-under-test and extrapolated over the adjacent channel to allow removal of its contribution to the first iteration $X_{E1}(\lambda)$ as follows:

5—Estimating the signal contribution to the SUT, $S_{Cn,E}(\lambda)$, over the channel-under-test by assuming a uniform ASE-noise over the channel-under-test and the adjacent channel, $N_{ASE}(\lambda)=N_{ASE}(\lambda_{peak})$, and by first neglecting linear crosstalk on the SUT, then $S_{Cn,E}(\lambda)=P_{sum}(\lambda)-N_{ASE}(\lambda_{peak})$ (as was done for estimating $S_{Cn+1,E}(\lambda)$ in step 204);

6—Finding, on the SUT side, the point (point C) on the estimated signal contribution $S_{Cn,E}(\lambda)$ that corresponds to 3 dB over $S_{Cn+1,E}(\lambda_{int})$:

$$S_{Cn,E}(\lambda_C)=S_{Cn,E}(\lambda_{int})+3 \text{ dB};$$

7—Finding, on the SUT side, the point (point D) on the estimated signal contribution $S_{Cn,E}(\lambda)$ that corresponds to 4 dB over $S_{Cn+1,E}(\lambda_{int})$:

$$S_{Cn,E}(\lambda_D)=S_{Cn,E}(\lambda_{int})+4 \text{ dB};$$

8—Linearly extrapolating, on a logarithmic scale (e.g. in dB units), the estimated signal contribution $S_{Cn,E1}(\lambda)$ over the channel-under-test from the selected points C and D to provide a first-iteration estimation of the linear-crosstalk contribution $X_{Cn+1,E1}(\lambda)$ on the adjacent channel;

9—Removing the extrapolated signal contribution $X_{Cn+1,E1}(\lambda)$ from the first-iteration estimation of the linear-crosstalk contribution $X_{E1}(\lambda)$ to provide a second-iteration estimation of the linear-crosstalk contribution $X_{E2}(\lambda)$; and 10—Optionally, the second-iteration estimation of the linear-crosstalk contribution $X_{E2}(\lambda)$ may also be removed from the first-iteration estimation of the linear-crosstalk contribution $X_{Cn+1,E1}(\lambda)$ in the adjacent channel to provide a second-iteration estimation $X_{Cn+1,E2}(\lambda)$ and steps 9 and 10 repeated to provide further iterations as necessary.

It should be appreciated that the values 3 dB and 4 dB have been shown to be appropriate in the context of a practical system application, and that these values may be varied without affecting the method of this embodiment.

In order to determine an in-band ASE-noise parameter, the signal, ASE-noise and linear-crosstalk contributions should be mutually discriminated within the channel-under-test (step 208). To this end, the relative angle θ between the SOP of the adjacent optical signal and of the SUT can be used.

Figure 6:
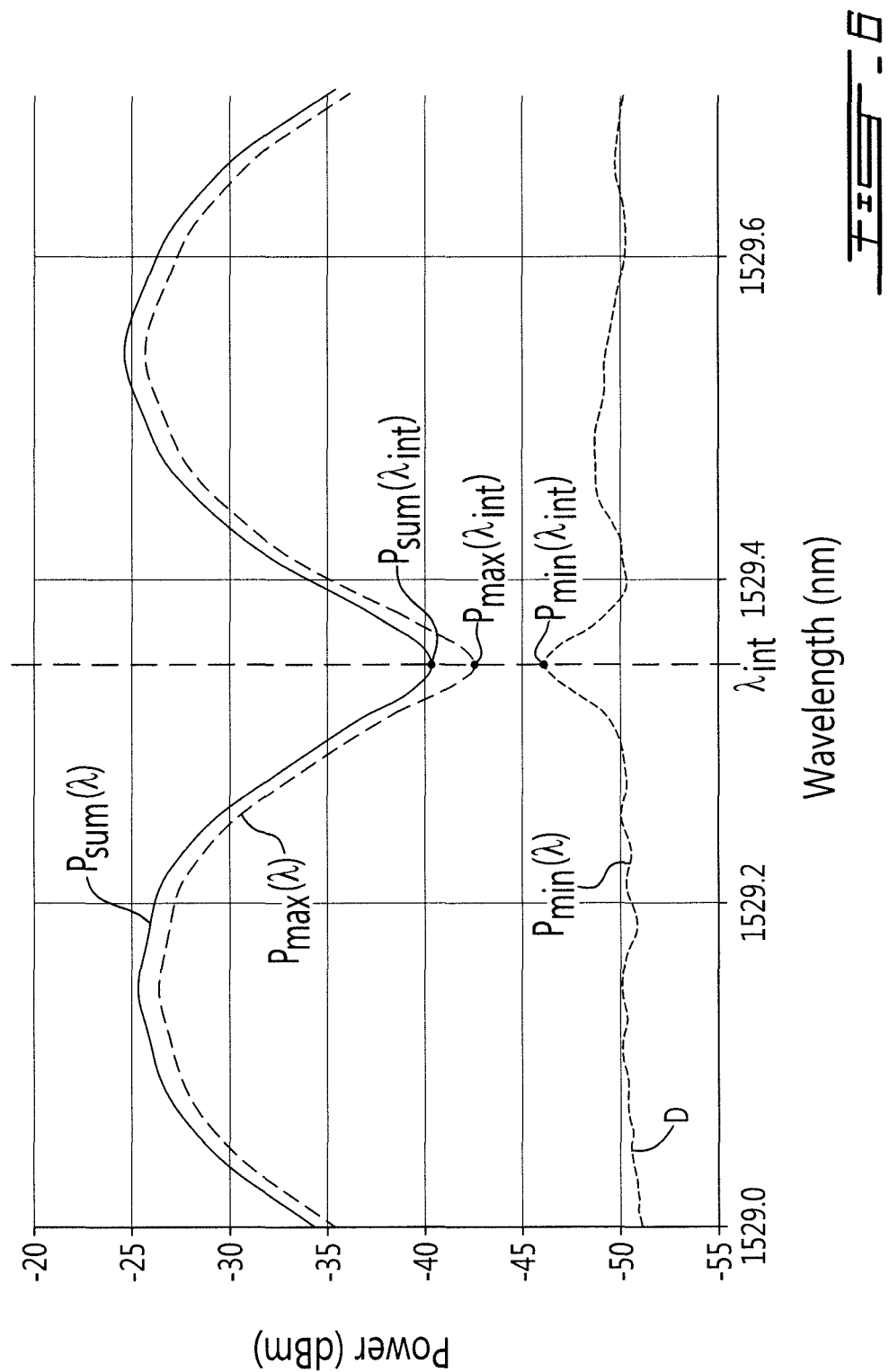
FIG. 6 is a graph illustrating one embodiment of a method for determining the relative SOP between the signal contribution of the adjacent optical signal and the signal contribution of the SUT, in accordance with Example 1 of the method of FIG. 2.

FIG. 6 illustrates one method for determining the relative angle θ as used in this embodiment. The relative angle θ, as defined on the Poincaré sphere, between the SOP vectors of the adjacent optical signal and the SUT is estimated by calculating a ratio R between the maximum value of $P_{min}(\lambda)$, i.e. at the interchannel crossing point $\lambda_{int}$ between the channel-under-test and the adjacent channel, from which the ASE-noise contribution is removed, and the minimum value of $P_{sum}(\lambda)$ at the said interchannel crossing point $\lambda_{int}$, from which the ASE-noise contribution is removed. By assuming that the linear-crosstalk contribution $X(\lambda_{int})$ is equal to the signal contribution $S(\lambda_{int})$ at the interchannel crossing point $\lambda_{int}$, the ratio R is a function of the relative angle θ:

$$R = \frac{P_{min}(\lambda_{int}) \cdot 0.5 N_{ASE}(\lambda_{peak})}{P_{sum}(\lambda_{int}) - N_{ASE}(\lambda_{peak})} = \frac{\sin^2(\theta/2) X(\lambda_{int})}{S(\lambda_{int}) + X(\lambda_{int})} \quad (13a)$$

$$R = \frac{\sin^2(\theta/2)}{2} \quad (13b)$$

from which the relative angle θ may be calculated:

$$\theta = 2 \arcsin(\sqrt{2R}) \quad (14b)$$

In the absence of ASE noise, the value of $P_{min}(\lambda)$ at the interchannel crossing point corresponds to half the value of $P_{sum}(\lambda)$ at the interchannel crossing point when the signals are cross-polarized, for a ratio R of 0.5, i.e. in the case of a relative angle θ of 180 degrees. In the case of parallel-polarized signals, i.e. a relative angle θ of 0 degree, the ratio R should be very small, i.e. limited only by the polarization-extinction ratio of the apparatus used to acquire the optical spectrum traces. The ratio effectively varies between 0 and 0.5.

The signal $S(\lambda)$, the ASE-noise $N_{ASE}(\lambda)$ and the linear-crosstalk $X(\lambda)$ contributions may now be mutually discriminated (step 208). From the estimated relative angle θ and the estimated linear-crosstalk contribution $X(\lambda)$ within the channel-under-test, the contribution of the linear crosstalk to the noise estimation of the SUT may be determined and subtracted to yield the ASE-only noise contribution.

The signal contribution $S(\lambda)$ is obtained by calculating the differential polarization response:

$$P_{max}(\lambda) - P_{min}(\lambda) = S(\lambda) + (\cos^2(\theta/2) - \sin^2(\theta/2)) X(\lambda) \quad (15)$$

and, knowing the relative angle θ from Equation (14b), obtaining:

$$S(\lambda) = P_{max}(\lambda) - P_{min}(\lambda) - (\cos^2(\theta/2) - \sin^2(\theta/2)) X(\lambda) \quad (16)$$

The ASE-noise contribution $N_{ASE}(\lambda)$ is obtained from Equation (7):

$$N_{ASE}(\lambda) = 2 P_{min}(\lambda) - 2 \sin^2(\theta/2) X(\lambda) \quad (17)$$

Of course, in another embodiment, instead of determining the entire spectrally-resolved ASE-noise trace, it is possible to use the information obtained on the linear-crosstalk contribution $X(\lambda)$ to select a spectral region across which the signal may be discriminated from the noise. Using the known linear crosstalk contribution $X(\lambda)$, the spectral region where it has a negligible contribution to the total-power optical spectrum trace $P_{sum}(\lambda)$ is estimated and signal-noise discrimination is then performed over this spectral region only, by assuming negligible linear crosstalk.

From the linear-crosstalk contribution $X(\lambda)$ and the relative angle θ determined from Equation (14b), the parallel-polarized linear crosstalk $X_\parallel(\lambda)$ and/or the cross-polarized crosstalk linear $X_\perp(\lambda)$ may be estimated and the estimated values outputted (step 210):

$$X_\parallel(\lambda) = X(\lambda) \cos^2(\theta/2) \quad (18)$$

$$X_\perp(\lambda) = X(\lambda) \sin^2(\theta/2) \quad (19)$$

It is noted that parallel-polarized linear crosstalk $X_\parallel(\lambda)$ is expected to have a more important impact on system performance than cross-polarized linear crosstalk $X_\perp(\lambda)$.

The linear-crosstalk OSNR as defined hereinabove may be estimated and outputted as well. Also, from the discriminated signal and ASE-noise contributions, the ASE-only OSNR may be calculated and outputted. Of course, other parameters may also be calculated and outputted. In one embodiment, the output parameters are ASE-only OSNR value, parallel and cross-polarized linear-crosstalk values, linear-crosstalk OSNR value and/or relative angle θ value.

Example 2

Figure 7:
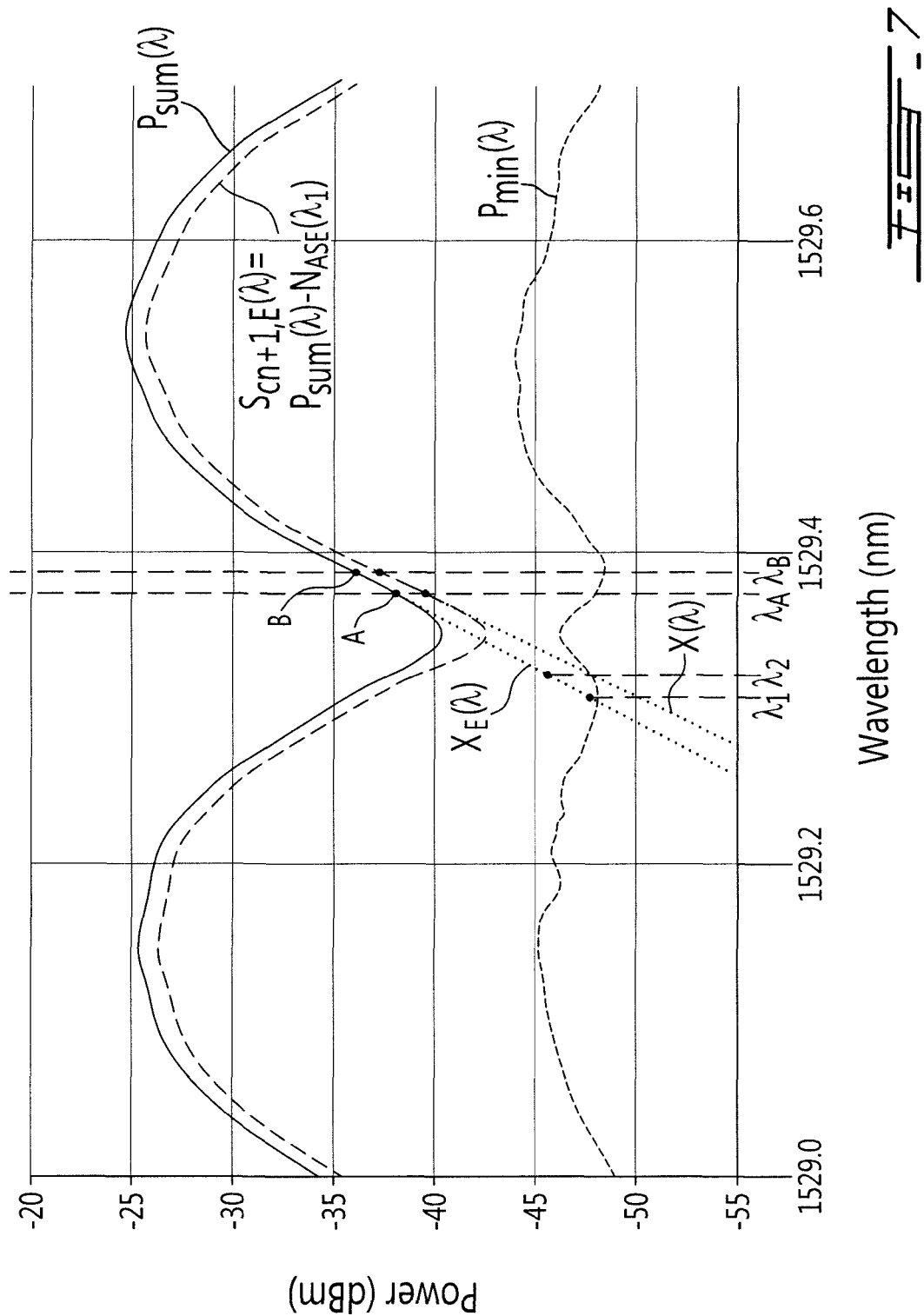
FIG. 7 is a graph illustrating one embodiment of a method for estimating the linear-crosstalk contribution in the SUT in accordance with Example 2 of the method of FIG. 2.

Another embodiment of method 200 of FIG. 2 is now described in more detail with reference to FIGS. 2, 5 and 7. The method of this embodiment is also suited to determine an in-band ASE-noise parameter, in addition to another linear-crosstalk-related parameter. Accordingly, the ASE-noise contribution to the SUT is determined by carrying out additional steps that may be unnecessary if only other linear-cross talk parameters are required.

In this embodiment, signal and noise contributions are discriminated on the SUT using a differential polarization response method. To this end, as in the embodiment of Example 1, a number $n_{SOP}$ of pairs of polarization-analyzed optical spectrum traces $P_\parallel(\lambda)$ and $P_\perp(\lambda)$ of the SUT and the adjacent optical signal are acquired under varied SOP analysis conditions (step 202). This may be performed by employing the system 500 of FIG. 5. The embodiment of Example 2 is more general than the embodiment of Example 1 in that it does not require that the number $n_{SOP}$ of pairs of polarization-analyzed optical spectrum traces $P_\parallel(\lambda)$ and $P_\perp(\lambda)$ be sufficiently large to assume complete suppression of the signal contribution of the SUT on one of the optical spectrum traces $P_\parallel(\lambda)$ and $P_\perp(\lambda)$.

In accordance with the differential polarization response method, from the $n_{SOP}$ pairs of acquired optical spectrum traces, composite extrema traces, i.e. a minimum $P_{minmin}(\lambda)$ and a maximum $P_{maxmax}(\lambda)$ trace, are determined. In this embodiment, in order to determine the minimum and maximum traces, composite extrema-ratio traces $r_{min}(\lambda)$, $r_{max}(\lambda)$ of the acquired mutually-orthogonal analyzed power levels $P_\parallel$ and $P_\perp$ are determined from the $n_{SOP}$ acquired pairs of mutually-orthogonal data sets by selecting, point-by-point in wavelength, among all acquired power levels among all $n_{SOP}$ acquired pairs of traces, the respective minimum and maximum ratio. Data are stored as the total-power optical spectrum trace $P_{sum}(\lambda)$ and the composite extrema-ratio traces $r_{min}(\lambda)$ and $r_{max}(\lambda)$, such that:

$$P_{sum}(\lambda) = P_\parallel(\lambda) + P_\perp(\lambda) \quad (20)$$

$$r_{min}(\lambda) = \min\{r(\lambda) = P_\parallel(\lambda)/P_\perp(\lambda)\}_{SOP} \quad (21)$$

$$r_{max}(\lambda) = \max\{r(\lambda) = P_\parallel(\lambda)/P_\perp(\lambda)\}_{SOP} \quad (22)$$

where $\min\{\bullet\}_{SOP}$ and $\max\{\bullet\}_{SOP}$ indicate "min-selecting" and "max-selecting" operations on the set of values corresponding to different SOPs at each individual wavelength. Furthermore, one can undertake "min-selecting" operations as a function of wavelength (λ) to obtain combined composite extrema-ratio traces, viz:

$$r_{minmin}(\lambda) = \min\{r_{min}(\lambda); [1/r_{max}(\lambda)]\}_\lambda \quad (23)$$

$$r_{maxmax}(\lambda) = \max\{r_{max}(\lambda); [1/r_{min}(\lambda)]\}_\lambda \quad (24)$$

Any variation in the overall optical power in the channel from one trace to another among the acquired traces used to synthesize ("construct") an extrema-ratio trace can be compensated ("normalized") in the data analysis using the corresponding $P_{sum}(\lambda)$. In this way, we can construct a "min-selecting" composite extrema-power spectral trace $P_{minmin}(\lambda)$ and a "max-selecting" composite extrema-power spectral trace $P_{maxmax}(\lambda)$ as $$P_{minmin}(\lambda)=\{r_{minmin}(\lambda)/[1+r_{minmin}(\lambda)]\}P_{sum}(\lambda)=P_{sum}(\lambda)/[1+r_{maxmax}(\lambda)] \quad (25)$$

$$P_{maxmax}(\lambda)=\{r_{maxmax}(\lambda)/[1+r_{maxmax}(\lambda)]\}P_{sum}(\lambda)=P_{sum}(\lambda)/[1+r_{minmin}(\lambda)] \quad (26)$$

Assuming $S(\lambda)>X(\lambda)$ in the spectral region of interest, the constructed composite extrema-power spectral traces $P_{minmin}(\lambda)$ and $P_{maxmax}(\lambda)$ effectively represent:

$$P_{maxmax}(\lambda)=\kappa S(\lambda)+0.5N_{ASE}(\lambda)+\kappa X_{\|}(\lambda)+(1-\kappa)X_{\perp}(\lambda) \quad (27)$$

$$P_{minmin}(\lambda)=(1-\kappa)S(\lambda)+0.5N_{ASE}(\lambda)+(1-\kappa)X_{\|}(\lambda)+\kappa X_{\perp}(\lambda) \quad (28)$$

where $\kappa$ is the portion of the signal contribution $S(\lambda)$ that is measured in $P_{maxmax}(\lambda)$ as defined as a function of $n_{SOP}$ such that $\kappa=0.5\times(2n_{SOP}+1)/(n_{SOP}+1)$ (see International Patent Application Publication WO 2011/020195 A1 to He et al., commonly owned by the Applicant and hereby incorporated by reference) and $\theta$ is the relative angle between the respective SOP vectors of the SUT and the adjacent optical signal on the Poincaré sphere. In this embodiment, it is also assumed for simplicity that the signal contribution $S(\lambda)$ is substantially polarized, that the ASE-noise contribution $N_{ASE}(\lambda)$ is substantially unpolarized and that the linear-crosstalk contribution $X(\lambda)$ is substantially polarized over the optical channel bandwidth. It is however noted that, in other embodiments, partial depolarization of the signal and partial polarization of the (otherwise unpolarized) ASE-noise may be taken into account and characterized in cases where one or both cannot be assumed negligible.

It should be appreciated that, for the limiting case of the polarization-sensitive spectrum analysis described herein for which the number of SOP analysis conditions $n_{SOP}$ is very high, the K parameter may be considered equal to unity, since, for at least one of the acquired optical spectrum trace, the SOP of the SUT, as generated by the polarization scrambler 516, is substantially aligned with one of the polarization axes of polarization beam splitter 520. However, the method described herein is more general and is also applicable to a reduced number of SOP analysis conditions $n_{SOP}$ for which the $(1-\kappa)$ value cannot be assumed null or negligibly small.

From the obtained extrema traces, a spectrally-resolved trace of the signal contribution $S_{Cn+1}(\lambda)$ to the adjacent optical signal is estimated (step 204) within the adjacent channel. As will now be explained, in this embodiment, the signal contribution $S_{Cn+1}(\lambda)$ is estimated using the total-power optical spectrum trace $P_{sum}(\lambda)$ as obtained over the adjacent channel, from which a first estimation of the ASE-noise contribution $N_{ASE}(\lambda)$ is removed. The method applied in Example 1 for estimating the signal contribution $S_{Cn+1}(\lambda)$ within the adjacent channel is also applied in this second example. However, as will now be detailed, the first estimation of the ASE-noise contribution $N_{ASE}(\lambda)$ is obtained in a different manner.

In accordance with this embodiment, in order to estimate the ASE-noise contribution $N_{ASE}(\lambda)$, a differential polarization response $S'(\lambda)$ is defined and readily calculated from the acquired optical spectrum curves:

$$S'(\lambda)=2P_{maxmax}(\lambda)-P_{sum}(\lambda) \quad (29)$$

where $S'(\lambda)=(2\kappa-1)S(\lambda)+(2\kappa-1)X_{\|}(\lambda)+(1-2\kappa)X_{\perp}(\lambda)$.

The total noise $N'(\lambda)$, including both ASE-noise and linear crosstalk, is then estimated as:

$$N'(\lambda)=P_{sum}(\lambda)-S'(\lambda)/(\kappa-1) \quad (30)$$

and using Equations (4), (18) and (19) for $P_{sum}(\lambda)$ and $X(\lambda)$, it can be found that:

$$N'(\lambda)=N_{ASE}(\lambda)+2X_{\perp}(\lambda)=N_{ASE}(\lambda)+2X(\lambda)\sin^2(\theta/2). \quad (31)$$

As will be readily understood from the following, in order to provide an estimation of the ASE-noise contribution in the interchannel region, a first estimation of the spectral shape of the linear crosstalk $X_E(\lambda)$ is calculated. In this embodiment, this first estimation is obtained by assuming that the ASE-noise contribution is negligible in comparison with the data-carrying signal contribution, across a spectral extent corresponding to the adjacent channel. As illustrated in FIG. 7, a first estimation $X_E(\lambda)$ of the shape of the linear crosstalk $X(\lambda)$ is calculated using an extrapolation as described in Example 1 but here applied directly to $P_{sum}(\lambda)$. In this embodiment, the extrapolation is performed using points A and B selected in the interchannel region in a similar fashion to the extrapolation applied to points A and B of Example 1, by defining, in this case:

$$P_{sum}(\lambda_A)=P_{sum}(\lambda_{min})+3 \text{ dB; and}$$

$$P_{sum}(\lambda_B)=P_{sum}(\lambda_{min})+4 \text{ dB}$$

where $\lambda_{min}$ is the wavelength corresponding to the minimum power value of $P_{sum}(\lambda)$ between the SUT and the adjacent optical signal. The thereby-obtained first estimation $X_E(\lambda)$ of the linear crosstalk is shown in FIG. 7.

Two points in wavelength, $\lambda_1$ and $\lambda_2$, for which $N_{ASE}(\lambda_1) \approx N_{ASE}(\lambda_2)$ and $X(\lambda_2)/X(\lambda_1)=r_X \neq 1$, are then selected in order to perform an estimation of the ASE-noise contribution. In this embodiment, wavelengths $\lambda_1$ and $\lambda_2$ are selected within a portion of the channel bandwidth directly adjacent the interchannel region of the SUT (see FIG. 7). For example, wavelengths $\lambda_1$ and $\lambda_2$ may be selected such that:

$$P_{sum}(\lambda_1)=P_{sum}(\lambda_{min})+4 \text{ dB; and}$$

$$P_{sum}(\lambda_2)=P_{sum}(\lambda_{min})+3 \text{ dB}$$

The ASE-noise contribution in the interchannel region is then estimated using $N'(\lambda)$ as obtained from Equation (30):

$$N'(\lambda_1)=N_{ASE}(\lambda_1)+2X(\lambda_1)\sin^2(\theta/2) \quad (32)$$

$$N'(\lambda_2)=N_{ASE}(\lambda_2)+2X(\lambda_2)\sin^2(\theta/2) \quad (33)$$

$$N_{ASE}(\lambda_1) \approx N_{ASE}(\lambda_2)=[N'(\lambda_2)-r_X N'(\lambda_1)]/(1-r_X) \quad (34)$$

where $X(\lambda_1)$, $X(\lambda_2)$ and $r_x$ are obtained using the first estimation of the spectral shape of the linear crosstalk $X_E(\lambda)$, i.e. $X(\lambda_1)=X_E(\lambda_1)$, $X(\lambda_2)=X_E(\lambda_2)$ and $r_x=X_E(\lambda_2)/X_E(\lambda_1)$.

As in Example 1, if one assumes a uniform ASE-noise over the channel-under-test and the adjacent channel, $N_{ASE}(\lambda)=N_{ASE}(\lambda_1)$, which corresponds to the first estimation of the ASE-noise contribution, the signal contribution to the adjacent optical signal over the adjacent channel, may then be estimated as:

$$S_{Cn+1,E}(\lambda)=P_{sum}(\lambda)-N_{ASE}(\lambda_1) \quad (35)$$

The linear-crosstalk contribution $X(\lambda)$, is then estimated (step 206) by linearly extrapolating the estimated signal contribution $S_{Cn+1,E}(\lambda)$ on a logarithmic scale (e.g. in dB units), as detailed in Example 1.

From (31), it is found that:

$$2\sin^2(\theta/2)=[N'(\lambda)-N_{ASE}(\lambda)]/X(\lambda) \quad (36)$$

and the relative angle $\theta$ between the SOP of the adjacent optical signal and of the SUT may be estimated from any one of the following relations:

$$2\sin^2(\theta/2) = [N'(\lambda_2) - N'(\lambda_1)]/[(X(\lambda_2) - X(\lambda_1))] \quad (36a)$$

$$2\sin^2(\theta/2) = [N'(\lambda_1) - N_{ASE}(\lambda_1)]/X(\lambda_1) \quad (36b)$$

$$2\sin^2(\theta/2) = [N'(\lambda_2) - N_{ASE}(\lambda_2)]/X(\lambda_2) \quad (36c)$$

Once the relative angle θ and the linear-crosstalk contribution $X(\lambda)$ within the channel-under-test are estimated, the signal contribution $S(\lambda)$, the ASE-noise contribution $N_{ASE}(\lambda)$ and the linear-crosstalk contribution $X(\lambda)$ may be mutually discriminated (step 208). More specifically, the contribution of the linear crosstalk to the noise estimation of the SUT $N'(\lambda)$ may be determined and subtracted to yield the ASE-only noise contribution $N_{ASE}(\lambda)$:

$$N_{ASE}(\lambda) = N'(\lambda) - 2\sin^2(\theta/2)X(\lambda) \quad (37)$$

and the signal contribution $S(\lambda)$ obtained by calculating the differential polarization response:

$$S(\lambda) = \frac{S'(\lambda) + \left[\sin^2(\theta/2) - \cos 2\left(\frac{\theta}{2}\right)\right]X(\lambda)}{2_\kappa - 1} \quad (38)$$

From the estimated relative angle θ and linear crosstalk contribution $X(\lambda)$, the parallel-polarized crosstalk $X_{\parallel}(\lambda)$ and/or the cross-polarized crosstalk $X_{\perp}(\lambda)$ may be estimated and the estimated values outputted (step 210):

$$X_{\parallel}(\lambda) = X(\lambda)\cos^2(\theta/2) \quad (39a)$$

$$X_{\perp}(\lambda) = X(\lambda)\sin^2(\theta/2) \quad (39b)$$

Also, from the discriminated signal and ASE-noise contributions, the ASE-only OSNR may be calculated and outputted. Of course, other parameters may also be calculated and outputted. In one embodiment, the output parameters are ASE-only OSNR value, parallel and cross-polarized linear-crosstalk values, linear-crosstalk OSNR value and/or relative angle θ value.

It should be appreciated that the aforementioned procedures for determining linear crosstalk and for determining θ of non-polarization-multiplexed signals may be carried out more rapidly if measurements are acquired using a wavelength-swept spectrally-selective polarimeter, since the relative SOPs of the SUT and adjacent perturber signal may then be determined from a single acquisition sweep. In particular, whereas the aforementioned polarization-diverse OSA apparatus requires a number $n_{SOP}$ of acquisitions under different analysis conditions in order to construct the "extrema trace" $P_{min}(\lambda)$, the wavelength-swept spectrally-selective polarimeter permits evaluation of $P_{min}(\lambda)$ in a single wavelength "sweep" from the four sets of wavelength-dependent Stokes parameters, viz $$P_{min}(\lambda) = 1 - [S_1(\lambda)^2 + S_2(\lambda)^2 + S_3(\lambda)^2]/S_0(\lambda)^2 \quad (40)$$

where $P_{mun}$ represents the sum of the ASE and linear-crosstalk-induced apparent depolarization.

Example 3

As mentioned hereinabove, method 200 of FIG. 2 also applies to the case of polarization-multiplexed optical signals.

Polarization multiplexing is frequently employed to maximize the information content transmitted over a given spectral bandwidth. A polarization-multiplexed channel comprises, two polarized data-carrying signals multiplexed in polarization such that their SOPs are mutually orthogonal, so as to share the same optical signal bandwidth. Normally, these two mutually-orthogonal polarized signals are transmitted with approximately the same intensity, and the resultant light appears effectively unpolarized on a test-and-measurement instrument, such as an OSA, having an electronic detection bandwidth much lower than the symbol rate of the transmitted multiplexed data-carrying signals.

One embodiment of method 200 of FIG. 2 as applied to the polarization-multiplexed case is now described.

In this embodiment, a non-polarization-analyzed optical spectrum trace $P_{sum}(\lambda)$ of the SUT and the adjacent optical signal is acquired using an OSA, for example (step 202).

The signal contribution $S_{Cn+1}(\lambda)$ is then estimated using the acquired optical spectrum trace $P_{sum}(\lambda)$ by discriminating the signal contribution from the total noise contribution within the SUT and the adjacent optical signal using, for example, methods referred to herein as "reference-based" methods and described in International Patent Application Publication WO 2011/097734 A1 to Gariépy et al. which is commonly owned by the Applicant and hereby incorporated by reference.

In summary, reference-based methods are predicated upon knowledge of the spectral shape of the data-carrying signal contribution of the SUT. Based on this knowledge, the signal and the total noise contributions may be mathematically discriminated from one another on an optical spectrum trace of the SUT and the adjacent optical signal. Knowledge of the spectral shape of the signal contribution may come from the acquisition of an optical spectrum trace of a reference signal taken at a different point, generally upstream, along the same optical communication link (i.e. the reference signal originates from the same optical transmitter), where the OSNR is known or where the signal can be considered free of noise. It may also come, for instance, from the acquisition of an optical spectrum trace of a reference signal taken on a different optical communication link on the network, originating from an optical transmitter that is distinct but is optically very similar or equivalent to the optical transmitter at the source of the SUT and the adjacent optical signal; or from prior acquisition of an optical spectrum trace of a reference signal originating from an optically very similar or equivalent optical transmitter from any network.

Referring back to FIG. 3, by applying a reference-based method, the signal contribution is discriminated from the total noise contribution within the SUT and the adjacent optical signal to provide an estimation of the signal contribution $S_{Cn+1}(\lambda)$ (trace B) over the adjacent optical signal (step 204). From the discriminated signal contribution $S_{Cn+1}(\lambda)$ of the adjacent optical signal within adjacent channel $c_{n+1}$ (trace B), the signal contribution $S_{Cn+1}(\lambda)$ of the adjacent optical signal within the channel-under-test $c_n$, i.e. $X(\lambda)$ (trace C), may then be estimated (step 206) by extrapolation of $S_{Cn+1}(\lambda)$ as discriminated. In one embodiment, the extrapolation is a linear extrapolation on a logarithmic scale (e.g. in dB units) as performed in Example 1. In another embodiment, advantageously applicable in the absence of spectrum-deforming effects such as self-phase modulation and/or in the absence of optical filtering disposed along the link between the upstream point and the point where the measurement is taken, the known spectral shape of the signal contribution, which is obtained from the reference signal and which spectrally extends beyond the optical channel bandwidth, is used for curve fitting. In this case, the known spectral shape is curve-fitted on the discriminated-signal contribution $S_{Cn+1}(\lambda)$ across the optical channel bandwidth of the adjacent optical signal. Values of the known spectral shape as fitted, which extend to the channel-under-test, provide for the extrapolation of $S_{Cn+1}(\lambda)$.

$S_{Cn+1}(\lambda)$, as extrapolated, corresponds to the optical spectrum of the linear crosstalk $X(\lambda)$ from which other relevant linear-crosstalk-related parameters may be obtained and outputted (step 210).

Of course, in order to allow calculation of output parameters such as the interchannel-crosstalk OSNR and the ASE-only OSNR, signal $S_{Cn}(\lambda)$ and ASE-noise $N_{ASE}(\lambda)$ contributions may also be mutually discriminated over the optical channel bandwidth of the SUT using a reference-based method and knowing that:

$$P(\lambda) = S_{Cn}(\lambda) + N_{ASE}(\lambda) + X(\lambda) \quad (41)$$

Example 4

Another embodiment of a method for determining the linear crosstalk on a SUT is now described. This method applies to the case of non-polarization-multiplexed signals. This method determines the linear crosstalk $X(\lambda)$ from the directly-acquired and/or extrema optical spectrum traces, without having to perform an estimation of the signal contribution $S_{Cn+1}(\lambda)$ of the adjacent optical spectrum trace.

In this embodiment, signal and noise contributions are discriminated on the SUT using a differential polarization response method. In this case, $n_{SOP}$ pairs of polarization-analyzed optical spectrum traces of the SUT and the adjacent optical signal are acquired under varied SOP analysis conditions (step 202). This may be performed by employing the system 500 of FIG. 5.

A number $n_{SOP}$ of pairs of mutually-orthogonal polarization-analyzed optical spectrum traces $P_\parallel(\lambda)$ and $P_\perp(\lambda)$ are acquired using $n_{SOP}$ varied SOP analysis conditions. From the $n_{SOP}$ pairs of acquired optical spectrum traces and by assuming negligible linear crosstalk in a limited spectral region encompassing the signal peak, the ASE-noise contribution $N_{ASE,E}$ may be estimated in this limited spectral region by employing the method described herein with reference to Equations (20) to (30) in Example 2, and assuming a uniform ASE noise over the channel-under-test, i.e. $N_{ASE}(\lambda) = N_{ASE,E}$.

Then, from Equation (2) and assuming the linear-crosstalk contribution $X(\lambda_{int})$ to be equal to the signal contribution $S_{Cn}(\lambda_{int})$ at the interchannel crossing point $\lambda_{int}$, we have:

$$X(\lambda_{int}) = \frac{P_{sum}(\lambda) - N_{ASE}(\lambda)}{2} \quad (42)$$

The relative angle $\theta$ is then calculated using Equation (36b) where $\lambda_1 = \lambda_{int}$ and $N_{ASE}(\lambda_{int}) = N_{ASE,E}$:

$$2\sin^2(\theta/2)X(\lambda) = \frac{N'(\lambda_{int}) - N_{ASE}(\lambda_{int})}{X(\lambda_{int})} \quad (43)$$

where $N'(\lambda)$ is calculated in accordance with Equation (30).

The optical spectrum of the linear crosstalk $X(\lambda)$ may then be obtained by combining Equation (35) with Equation (36b) where $\lambda_1 = \lambda_{int}$:

$$X(\lambda) = \frac{(N(\lambda) - N_{ASE,E})X(\lambda_{int})}{N(\lambda_{int}) - N_{ASE,E}} \quad (44)$$

The optical spectrum of the linear crosstalk $X(\lambda)$ and the relative angle $\theta$ being both determined, the parallel-polarized crosstalk $X_\parallel(\lambda)$ and/or the cross-polarized crosstalk $X_\perp(\lambda)$ may be calculated as detailed above, and their values outputted.

Also, from the discriminated signal and ASE-noise contributions, the ASE-only OSNR may be calculated and outputted. Of course, other parameters may also be calculated and outputted.

In all the examples described above as applied to non-polarization-multiplexed signals, it will be understood that for the case where an adjacent optical signal $p_{Cn-1}$ is present on the blue side of the SUT, the linear crosstalk and the relative angle corresponding to this adjacent optical signal $p_{Cn-1}$ may also be evaluated by employing the methods described herein. By defining the linear crosstalk $X_-(\lambda)$ and $X_+(\lambda)$ and the relative angles $\theta_-$ and $\theta_+$ arising respectively from adjacent optical signals $p_{Cn-1}$ and $p_{Cn+1}$, the linear crosstalk may be defined as:

$$X(\lambda) = X_-(\lambda) + X_+(\lambda) \quad (45)$$

and the parallel-polarized crosstalk $X_\parallel(\lambda)$ and cross-polarized crosstalk $X_\perp(\lambda)$ be defined as:

$$X_\parallel(\lambda) = X_-(\lambda)\cos^2(\theta_-/2) + X_+(\lambda)\cos^2(\theta_+/2) \quad (46)$$

$$X_\perp(\lambda) = X_-(\lambda)\sin^2(\theta_-/2) + X_+(\lambda)\sin^2(\theta_+/2). \quad (47)$$

For the above, a linear crosstalk parameter referred to herein as the "optical-signal to linear-crosstalk ratio" (OSNR$_X$) may be defined as the ratio of the signal power to the linear-crosstalk noise power:

$$OSNR_X = 10\log_{10}\left(\frac{\int_{CBW} S(\lambda)d\lambda}{\int_{RBW} X(\lambda)d\lambda}\right) \quad (48)$$

Also, since the parallel-polarized crosstalk $X_\parallel(\lambda)$ tends to have greater impact on the optical signal quality than cross-polarized crosstalk $X_\perp(\lambda)$, it may be convenient to define an additional linear-crosstalk-related parameter, referred to herein as the "optical-signal to parallel-crosstalk ratio" (OSNR$_{X\square}$), which may be defined as the ratio of the signal power to the parallel crosstalk noise power:

$$OSNR_{X\square} = 10\log_{10}\left(\frac{\int_{CBW} S(\lambda)d\lambda}{\int_{RBW} X_\parallel(\lambda)d\lambda}\right) \quad (49)$$

In the case of polarization-multiplexed signals, the linear crosstalk corresponding to the adjacent optical signal $p_{Cn-1}$ may also be evaluated by employing the methods of Example 3 described herein. By defining the linear crosstalk $X_-(\lambda)$ and $X_+(\lambda)$ arising respectively from adjacent optical signals $p_{Cn-1}$ and $p_{Cn+1}$, the linear crosstalk may also be defined as per Equation (45). The linear-crosstalk-related parameter(s) to be determined may then be calculated accordingly and outputted. For example, in the case of polarization-multiplexed signals, the optical-signal to crosstalk ratio as defined in Equation (48) may be used as the linear-crosstalk-related parameter.

FIG. 8 illustrates a method 800 for determining an interchannel relative state-of-polarization parameter characterizing adjacent non-polarization-multiplexed optical signals propagating in a common optical fiber, in accordance with one embodiment. An optical signal-under-test and an adjacent optical signal of a channel adjacent to said optical signal-under-test each comprise respective data-carrying signal contributions within their respective optical signal bandwidths. In step 802, at least two polarization-analyzed optical spectrum traces are acquired for each of a number $n_{SOP}$ of different state-of-polarization analysis conditions. In step 804, at least one extrema trace from the acquired said at least two polarization-analyzed optical spectrum traces is determined. In step 806, the method 800 includes, for one acquired optical spectrum trace, determining, within said spectral range, a minimum value; obtaining an estimated ASE noise contribution; and obtaining a power value by removing from the minimum value the estimated ASE noise contribution. Similarly, in step 808, the method 800 includes, for one of said extrema trace, determining, within said spectral range, a minimum value; obtaining an estimated ASE noise contribution; and obtaining a power value by removing from the minimum value the estimated ASE noise contribution. In step 810, the interchannel relative state-of-polarization parameter is determined by comparing the power value obtained for the optical spectrum trace with the power value obtained for the extrama trace.

In embodiments described herein, the linear-crosstalk contribution $X(\lambda)$ is typically evaluated so as to estimate linear-crosstalk-related parameters. However, in other embodiments, it may only be necessary to estimate in-band ASE-noise parameters. Nevertheless, even in this case, knowledge of the linear-crosstalk contribution $X(\lambda)$ allows for an improved characterization of in-band ASE-noise in the optical signal bandwidth of the SUT as compared to prior art methods. For example, an estimation of the optical spectrum of the linear crosstalk may be employed to select a spectral portion of the optical channel bandwidth of the SUT over which the linear crosstalk may be considered negligible. The ASE-noise contribution may then be evaluated over this selected spectral portion of the optical channel bandwidth.

It should be appreciated that, although the embodiments described above assume that the widths of the optical channels are determined principally by one or more optical filters disposed between the corresponding transmitters and the receivers, these embodiments may readily be modified to characterize linear-crosstalk-related parameters in so-called "filter-less" WDM/DWDM systems based on coherent detection, where the filtering is carried out electrically in the rf baseband of the network receivers, (See, for instance, C. Tremblay et al, "Filterless WDM Optical Core Networks Based on Coherent Systems", Proceedings of $13^{th}$ International Conference on Transparent Optical Networks—ICTON 2011, Paper Tu.D1.4.) In such a case, the bandwidth of the channel-under-test as described hereinbefore with reference to "optically filtered" signals may be determined by the electrical bandwidth of the corresponding receiver, and this known bandwidth would be employed in the analysis described hereinabove. Alternatively, the effective optical channel bandwidth may be chosen to be any desired value by the user, e.g. in the course of modeling optically-induced-noise tolerance in a particular receiver.

The embodiments described above are intended to be illustrative only. The scope of the invention is therefore intended to be limited solely by the appended claims.

What is claimed is:

1. A method of determining at least one linear-crosstalk-related parameter of an optical signal-under-test having, within an optical channel bandwidth, at least a data-carrying signal contribution and a wavelength-dependent linear-crosstalk contribution arising from a data-carrying signal contribution of an adjacent optical signal associated with an adjacent channel to the optical signal-under-test, the method comprising:

using an optical spectrum analyzer, acquiring at least one optical spectrum trace encompassing a quasi-continuum of closely-spaced wavelengths over a spectral range extending to at least part of both the signal under test and the adjacent optical signal, wherein both of said signal-under-test and said adjacent optical signal are non-polarization-multiplexed, said acquiring comprises acquiring said at least one optical spectrum trace in a polarization-analyzed manner for each of a number $n_{SOP}$ of at least two different state-of-polarization analysis conditions; and determining at least one extrema trace from said at least two polarization-analyzed optical spectrum traces;

using a processor, determining a data-carrying signal contribution of said adjacent optical signal at at least some wavelength values within said adjacent channel using at least one of said at least one optical spectrum trace;

extrapolating the determined data-carrying signal contribution within a portion of the optical channel bandwidth that corresponds to at least a portion of the spectral range;

estimating said linear-crosstalk contribution based on the extrapolated data-carrying signal contribution of said adjacent optical signal, wherein said estimating said linear-crosstalk contribution comprises using at least spectral properties of said at least one extrema trace;

wherein said at least one linear-crosstalk-related parameter is determined at least from the estimated linear-crosstalk contribution, further comprising estimating an interchannel relative state-of-polarization between said data-carrying signal contribution of said adjacent optical signal and said data-carrying signal contribution of said signal-under-test, wherein a further one of said at least one linear crosstalk-related parameter is the interchannel relative state-of-polarization.

2. The method as claimed in claim 1, wherein said determining said data-carrying signal contribution of said adjacent optical signal includes estimating said data-carrying signal contribution assuming a negligible amplified spontaneous noise contribution.

3. The method as claimed in claim 1, wherein said extrapolating comprises:

identifying a region of the optical spectrum trace having at least two wavelengths on the adjacent optical signal, the region being linear when represented a logarithmic scale, and calculating an adjacent signal projection of the linear region into the optical channel bandwidth of the signal-under-test, said projection being linear when represented on the logarithmic scale.

4. The method as claimed in claim 3, wherein said extrapolating further comprises:

identifying a region of the optical spectrum trace having at least two wavelengths on the optical signal-under-test, the region being linear when represented on the logarithmic scale, calculating a signal-under-test projection of the linear region of the optical signal-under-test into the adjacent channel, said adjacent projection being linear when represented on the logarithmic scale, and refining said adjacent signal projection using said calculated signal-under-test projection.

5. The method as claimed in claim 1 further comprising determining another one of said at least one linear crosstalk-related parameter using the estimated relative state-of-polarization.

6. The method as claimed in claim 5, wherein said linear-crosstalk-related parameter comprises a parallel Optical Signal-to-Crosstalk Ratio.

7. The method as claimed in claim 1, wherein said estimating an interchannel relative state-of-polarization includes using at least said at least one extrema trace.

8. A method of determining at least one linear-crosstalk-related parameter of an optical signal-under-test having, within an optical channel bandwidth, at least a data-carrying signal contribution and a wavelength-dependent linear-crosstalk contribution arising from a data-carrying signal contribution of an adjacent optical signal associated with an adjacent channel to the optical signal-under-test, the method comprising:

using an optical spectrum analyzer, acquiring at least one optical spectrum trace encompassing a quasi-continuum of closely-spaced wavelengths over a spectral range extending to at least part of both the signal under test and the adjacent optical signal, wherein both of said signal-under-test and said adjacent optical signal are non-polarization-multiplexed, said acquiring comprises:
acquiring said at least one optical spectrum trace in a polarization-analyzed manner for each of a number nSOP of at least two different state-of-polarization analysis conditions; and
determining at least one extrema trace from said at least two polarization-analyzed optical spectrum traces;
using a processor,
determining a data-carrying signal contribution of said adjacent optical signal at at least some wavelength values within said adjacent channel using at least one of said at least one optical spectrum trace;
extrapolating the determined data-carrying signal contribution within a portion of the optical channel bandwidth that corresponds to at least a portion of the spectral range;
estimating said linear-crosstalk contribution based on the extrapolated data-carrying signal contribution of said adjacent optical signal, wherein said estimating said linear-crosstalk contribution comprises using at least spectral properties of said at least one extrema trace;
wherein said at least one linear-crosstalk-related parameter is determined at least from the estimated linear-crosstalk contribution, further comprising,
for one acquired optical spectrum trace:
determining, within said spectral range, a minimum value,
obtaining an estimated ASE noise contribution,
obtaining a power value by removing from the minimum value the estimated ASE noise contribution,
for one of said extrema trace
determining, within said spectral range, a minimum value,
obtaining an estimated ASE noise contribution,
obtaining a power value by removing from the minimum value the estimated ASE noise contribution, and determining a relative state of polarization parameter by comparing the power value obtained for the optical spectrum trace with the power value obtained for the extrema trace.

9. A method of determining at least one linear-crosstalk-related parameter of an optical signal-under-test having, within an optical channel bandwidth, at least a data-carrying signal contribution and a wavelength-dependent linear-crosstalk contribution arising from a data-carrying signal contribution of an adjacent optical signal associated with an adjacent channel to the optical signal-under-test, the method comprising:

using an optical spectrum analyzer, acquiring at least one optical spectrum trace encompassing a quasi-continuum of closely-spaced wavelengths over a spectral range extending to at least part of both the signal under test and the adjacent optical signal, wherein both of said signal-under-test and said adjacent optical signal are non-polarization-multiplexed, said acquiring comprises:
acquiring said at least one optical spectrum trace in a polarization-analyzed manner for each of a number nSOP of at least two different state-of-polarization analysis conditions; and
determining at least one extrema trace from said at least two polarization-analyzed optical spectrum traces;
using a processor,
determining a data-carrying signal contribution of said adjacent optical signal at at least some wavelength values within said adjacent channel using at least one of said at least one optical spectrum trace;
extrapolating the determined data-carrying signal contribution within a portion of the optical channel bandwidth that corresponds to at least a portion of the spectral range;
estimating said linear-crosstalk contribution based on the extrapolated data-carrying signal contribution of said adjacent optical signal, wherein said estimating said linear-crosstalk contribution comprises using at least spectral properties of said at least one extrema trace;
wherein said at least one linear-crosstalk-related parameter is determined at least from the estimated linear-crosstalk contribution, wherein said signal-under-test has an Amplified Spontaneous Emission (ASE) noise contribution, said method further comprising mutually discriminating said data-carrying signal contribution, said ASE-noise contribution and said linear crosstalk contribution on said signal-under-test using the estimated linear crosstalk contribution and at least one of said at least one extrema trace; and determining an in-band ASE-noise parameter on said optical signal-under-test using at least the discriminated ASE-noise contribution.

10. The method as claimed in claim 9 further comprising:
identifying a region of one of said at least one extrema trace representative of a data-carrying signal contribution of the adjacent optical signal, the region being linear when represented a logarithmic scale, and
calculating an extrema trace projection of the linear region into the optical channel bandwidth of the signal-under-test, said extrema trace projection being linear when represented on the logarithmic scale.

11. The method as claimed in claim 10, further comprising determining a slope of the extrema trace projection;
identifying a region of one of said at least one optical spectrum trace representative of a data-carrying signal contribution of the adjacent optical signal, the region being linear when represented on the logarithmic scale;

calculating an adjacent signal projection of the linear region into the optical channel bandwidth, said projection being linear when represented on the logarithmic scale; and determining a slope of the adjacent signal projection; and determining a relative state of polarization parameter based on said slope of the adjacent signal projection and said slope of the extrema trace projection.

12. The method as claimed in claim 9 wherein said in-band ASE-noise parameter comprises an ASE-only Optical Signal-to-Noise Ratio (ASE-only OSNR).

13. The method as claimed in claim 9, further comprising calculating an Optical Signal-to-Crosstalk Ratio from a ratio of a power of the data-carrying signal contribution of the signal-under-test to the linear-crosstalk contribution within said optical channel bandwidth, wherein said linear-crosstalk-related parameter comprises the Optical Signal-to-Crosstalk Ratio.

14. The method as claimed in claim 9, wherein said optical signal-under-test and said adjacent optical signal are spatially-multiplexed signals in a common optical fiber, each propagating primarily in a corresponding different guided mode of said optical fiber, and each characterized by different respective central wavelengths, wherein the difference between said respective central wavelengths is less than five times said optical channel bandwidth of the optical signal-under-test; and said acquiring at least one optical spectrum trace includes acquiring an optical spectrum trace corresponding to each one of said different guided modes.

15. The method of claim 9 further comprising at least one of displaying and outputting said at least one linear-crosstalk-related parameter determined.

16. The method as claimed in claim 9, wherein said at least one linear-crosstalk-related parameter comprises ASE Noise contribution, further comprising determining a portion of said spectral range within said optical channel bandwidth for which the linear-crosstalk contribution is considered negligible compared to the ASE-noise contribution based on said estimated linear-crosstalk contribution, and discriminating said ASE-noise contribution from said data-carrying signal contribution over said portion of said spectral range by assuming a negligible linear-crosstalk contribution over said portion of said spectral portion.

17. The method as claimed in claim 16, wherein, over said spectral portion, the estimated linear crosstalk contribution is considered negligible compared to at least one of:

a minimum expected value of ASE-noise contribution; and a first estimation of ASE-noise contribution.

18. A method of determining at least one linear-crosstalk-related parameter of an optical signal-under-test having, within an optical channel bandwidth, at least a data-carrying signal contribution and a wavelength-dependent linear-crosstalk contribution arising from a data-carrying signal contribution of an adjacent optical signal associated with an adjacent channel to the optical signal-under-test, the method comprising:

using an optical spectrum analyzer, acquiring at least one optical spectrum trace encompassing a quasi-continuum of closely-spaced wavelengths over a spectral range extending to at least part of both the signal under test and the adjacent optical signal, wherein said signal-under-test and said adjacent optical signal are polarization-multiplexed optical signals wherein said acquiring includes obtaining at least one reference optical spectrum trace from a reference signal comprising a data-carrying signal contribution spectrally representative of said data-carrying signal contribution of said adjacent optical signal; and using a processor, determining a data-carrying signal contribution of said adjacent optical signal at at least some wavelength values within said adjacent channel using at least one of said at least one optical spectrum trace;

extrapolating the determined data-carrying signal contribution within a portion of the optical channel bandwidth that corresponds to at least a portion of the spectral range;

estimating said linear-crosstalk contribution based on the extrapolated data-carrying signal contribution of said adjacent optical signal;

wherein said at least one linear-crosstalk-related parameter is determined at least from the estimated linear-crosstalk contribution, wherein said signal-under-test further has an Amplified Spontaneous Emission (ASE) noise contribution;

wherein said reference optical spectrum trace of said reference signal further comprises a data-carrying signal contribution spectrally representative of said data-carrying signal contribution of said signal-under-test;

and further comprising:

mutually discriminating said data-carrying signal contribution, said ASE-noise contribution and said linear-crosstalk contribution on said signal-under-test using the estimated linear-crosstalk contribution and said reference optical spectrum trace;

wherein said at least one linear-crosstalk-related parameter comprises said discriminated ASE-noise contribution.

19. The method as claimed in claim 18 wherein said at least one linear-crosstalk-related parameter further comprises an ASE-only Optical Signal-to-Noise Ratio (ASE-only OSNR).

20. A method for determining an interchannel relative state-of-polarization parameter characterizing adjacent non-polarization-multiplexed optical signals propagating in a common optical fiber, wherein an optical signal-under-test and an adjacent optical signal of a channel adjacent to said optical signal-under-test each comprise respective data-carrying signal contributions within their respective optical signal bandwidths, the method comprising:

using an optical spectrum analyzer, acquiring, for each of a number $n_{SOP}$ of different state-of-polarization analysis conditions, at least two polarization-analyzed optical spectrum traces encompassing a quasi-continuum of closely-spaced wavelengths over a wavelength range corresponding to at least part of the signal-under-test and contiguous wavelengths intermediate to said signal-under-test and said adjacent optical signal; and using a processor, determining at least one extrema trace from the acquired said at least two polarization-analyzed optical spectrum traces;

for one acquired optical spectrum trace:

determining, within said spectral range, a minimum value;

obtaining an estimated ASE noise contribution; and obtaining a power value by removing from the minimum value the estimated ASE noise contribution;

for said at least one extrema trace:
  determining, within said spectral range, a minimum value;
  obtaining an estimated ASE noise contribution; and
  obtaining a power value by removing from the minimum value the estimated ASE noise contribution; and determining said interchannel relative state-of-polarization parameter indicative of the relative state-of-polarization between said data-carrying signal contribution of said adjacent optical signal and said data-carrying signal contribution of said signal-under-test using at least said at least one extrema trace by comparing the power value obtained for the optical spectrum trace with the power value obtained for the extrema trace.

21. An apparatus for determining at least one linear-crosstalk-related parameter of an optical signal-under-test having, within an optical channel bandwidth, at least a data-carrying signal contribution and a wavelength-dependent linear-crosstalk contribution arising from a data-carrying signal contribution of an adjacent optical signal associated with an adjacent channel to the optical signal-under-test, the apparatus comprising:

an optical spectrum analyzer to acquire at least one optical spectrum trace encompassing a quasi-continuum of closely-spaced wavelengths over a spectral range extending to at least part of both the signal under test and the adjacent optical signal, wherein both of said signal-under-test and said adjacent optical signal are non-polarization-multiplexed, the optical spectrum analyzer:
  acquiring said at least one optical spectrum trace in a polarization-analyzed manner for each of a number nSOP of at least two different state-of-polarization analysis conditions; and
  determining at least one extrema trace from said at least two polarization-analyzed optical spectrum traces;

a spectrum processor to determine a data-carrying signal contribution of said adjacent optical signal at at least some wavelength values within said adjacent channel using at least one of said at least one optical spectrum trace;

a parameter calculator to extrapolate the determined data-carrying signal contribution within a portion of the optical channel bandwidth that corresponds to at least a portion of the spectral range and to estimate said linear-crosstalk contribution based on the extrapolated data-carrying signal contribution of said adjacent optical signal, wherein said at least one linear-crosstalk-related parameter is determined at least from the estimated linear-crosstalk contribution, wherein said estimating said linear-crosstalk contribution comprises using at least spectral properties of said at least one extrema trace; and at least one of a display to display at least one of said at least one linear-crosstalk-related parameter and an output to output at least one of said at least one linear-crosstalk-related parameter, wherein said signal-under-test has an Amplified Spontaneous Emission (ASE) noise contribution, said apparatus mutually discriminating said data-carrying signal contribution, said ASE-noise contribution and said linear crosstalk contribution on said signal-under-test using the estimated linear crosstalk contribution and at least one of said at least one extrema trace; and determining an in-band ASE-noise parameter on said optical signal-under-test using at least the discriminated ASE-noise contribution.

22. The apparatus according to claim 21 wherein said optical signal-under-test and said adjacent optical signal are both non-polarization multiplexed, and wherein the optical spectrum analyzer is adapted to acquire at least two of said at least one optical spectrum traces under different polarization analysis conditions at a time.

23. The apparatus according to claim 21 wherein the at least one optical spectrum trace corresponds to a set of at least one series of optical powers corresponding to narrow spectral portions centered about said closely-spaced wavelengths, said narrow spectral portions corresponding to a filter function having a spectral width smaller than said optical channel bandwidth.

24. The apparatus according to claim 21 further comprising a detector/processor to detect, store and subsequently process at least some of said at least one optical spectrum trace.

* * * * *